US012515924B2

(12) United States Patent
Wijning et al.

(10) Patent No.: US 12,515,924 B2
(45) Date of Patent: Jan. 6, 2026

(54) HEAVY LIFT CRANE

(71) Applicant: ITREC B.V., Schiedam (NL)

(72) Inventors: Diederick Bernardus Wijning, Schiedam (NL); Eric Romeijn, Schiedam (NL); Joop Roodenburg, Schiedam (NL)

(73) Assignee: ITREC B.V., Schiedam (NL)

( * ) Notice: Subject to any disclaimer, the term of this patent is extended or adjusted under 35 U.S.C. 154(b) by 329 days.

(21) Appl. No.: 18/013,382

(22) PCT Filed: Jun. 29, 2021

(86) PCT No.: PCT/EP2021/067889
§ 371 (c)(1),
(2) Date: Dec. 28, 2022

(87) PCT Pub. No.: WO2022/002963
PCT Pub. Date: Jan. 6, 2022

(65) Prior Publication Data

US 2023/0331524 A1 Oct. 19, 2023

(30) Foreign Application Priority Data

Jun. 29, 2020 (NL) ...................................... 2025943

(51) Int. Cl.
*B66C 23/52* (2006.01)
*B66C 23/58* (2006.01)
(Continued)

(52) U.S. Cl.
CPC .............. *B66C 23/52* (2013.01); *B66C 23/58* (2013.01); *B66C 23/905* (2013.01); *B66C 23/92* (2013.01); *B66C 2700/084* (2013.01)

(58) Field of Classification Search
CPC ......... B66C 23/92; B66C 23/88; B66C 23/52; B66C 23/82; B66C 23/60; B66C 13/20;
(Continued)

(56) References Cited

U.S. PATENT DOCUMENTS 2,376,019 A * 5/1945 Thomas .................. B66C 23/92
192/85.48
2,840,244 A * 6/1958 Thomas, Jr. ............ B66C 23/92
254/269
(Continued)

FOREIGN PATENT DOCUMENTS

CN 101891124 A 11/2010
CN 202089711 U 12/2011
(Continued)

OTHER PUBLICATIONS

Dutch Search Report, issued in Priority Application No. 2025943, dated Apr. 23, 2021.
(Continued)

*Primary Examiner* — Anna M Momper
*Assistant Examiner* — Henrix Soto
(74) *Attorney, Agent, or Firm* — Birch, Stewart, Kolasch & Birch, LLP

(57) ABSTRACT

A crane for use on an offshore vessel is provided with a boom restrainer, wherein the boom restrainer is a hydro-pneumatic boom restrainer, for reducing upward pivoting of the boom, when the boom is in the top zone, wherein the boom restrainer includes: multiple hydraulic cylinders, each having a hydraulic circuit and a cylinder rod with a cylinder head, wherein the cylinders are mounted on the crane structure with the cylinder heads directed towards the boom of the crane, preferably are mounted on a stay of the crane structure, a catcher for each hydraulic cylinder, wherein each catcher is mounted on the boom and is configured for
(Continued)

receiving the cylinder head of the corresponding hydraulic cylinder, and to lock the cylinder head, preferably pivotable locks the cylinder head, relative to the boom, when the boom pivots upwards in the top zone; a gas buffer for each hydraulic cylinder, wherein each gas buffer is mounted to the corresponding hydraulic cylinder, and is connected to the hydraulic circuit of the corresponding hydraulic cylinder via a medium separator, wherein the gas buffer forces the hydraulic cylinder in an extended position, and wherein the volume ratio between the hydraulic cylinder and the gas buffer is such that the hydraulic cylinder acts as a progressive spring, e.g. the gas buffers each have a size in the range of 1000-1400 litre, for example 1200 litre and the hydraulic cylinders each have a size in the range of 800-1000 litre, for example 900 litre, and preferably the ratio between the volume of the gas buffer and the volume of the associated hydraulic cylinder is 4:3.

21 Claims, 10 Drawing Sheets

(51) Int. Cl.
*B66C 23/90* (2006.01)
*B66C 23/92* (2006.01)

(58) Field of Classification Search
CPC ....... B66C 23/94; B66C 23/823; B63B 23/40; B63B 27/10
USPC .......................................................... 212/276
See application file for complete search history.

(56) References Cited

U.S. PATENT DOCUMENTS

| | | | | | |
|---|---|---|---|---|---|
| 2,919,037 | A | * | 12/1959 | Kahl, Jr. | B66C 23/92 212/293 |
| 3,092,261 | A | | 6/1963 | Nesbit | |
| 3,123,223 | A | * | 3/1964 | Markwardt | B66C 23/92 212/293 |
| 3,647,087 | A | | 3/1972 | Mooney | |
| 3,872,670 | A | * | 3/1975 | Dezelan | E02F 9/2207 60/484 |
| 4,003,474 | A | * | 1/1977 | Mooney | B66C 23/92 212/293 |
| 5,676,264 | A | | 10/1997 | Wilson | |
| 8,910,807 | B2 | * | 12/2014 | Wernecke | B66C 23/92 212/293 |
| 2018/0134528 | A1 | | 5/2018 | Oka et al. | |

FOREIGN PATENT DOCUMENTS

| | | | | | |
|---|---|---|---|---|---|
| CN | 103350964 | A | * | 10/2013 | |
| CN | 102285601 | B | | 12/2013 | |
| EP | 2 253 577 | B1 | | 4/2017 | |
| GB | 1 511 428 | | | 5/1978 | |
| JP | 07172773 | A | * | 7/1995 | B66C 23/92 |
| JP | 0825713 | B2 | * | 3/1996 | |
| JP | 2000-109290 | A | | 4/2000 | |
| KR | 20090110837 | A | * | 10/2009 | |
| WO | WO 2009/048322 | A1 | | 4/2009 | |
| WO | WO 2010/114359 | A1 | | 10/2010 | |
| WO | WO-2013013414 | A1 | * | 1/2013 | B66C 23/92 |

OTHER PUBLICATIONS

International Search Report, issued in PCT/EP2021/067889, dated Oct. 19, 2021.
Written Opinion of the International Searching Authority, issued in PCT/EP2021/067889, dated Oct. 19, 2021.
English translation of the Chinese Office Action for Chinese Application No. 202180051853.6, dated Mar. 28, 2025.

* cited by examiner

HEAVY LIFT CRANE

The present invention relates to a crane for use on an offshore vessel, in particular to a heavy lift crane for use in offshore wind turbine installation, more in particular for installation of piles for supporting wind turbines. The invention further relates to an offshore crane vessel, i.e. a vessel comprising such a heavy lift crane, and a pile installation method in which use is made of such an offshore crane vessel and/or heavy lift crane. e.g. for installation of a pile adapted to support an offshore wind turbine.

In the field of offshore cranes, there is a trend towards larger cranes, in particular for installing piles for supporting offshore wind turbines. Installing offshore wind turbines at locations with larger water depths than currently encountered, result in larger and heavier foundations. Hence, it is expected that in the near future piles need to be installed that are larger than 100 metres, possibly 120 metres or lager. Therefore the handling of such components requires a very tall crane. Also the mass of such piles may be larger than 1000 mt, possibly 1300 mt or above.

Larger and heavier piles, require larger and heavier cranes, in particular require cranes having a long boom. Typically, cranes for installing piles are slewing cranes. The cranes can be pedestal mounted cranes, be around the leg cranes, or be mast cranes. The cranes have a boom for supporting and positioning the pile. The length of these booms may be 150 meters or more.

In addition there is also a trend to install these piles from a floating vessel, and along a side of the vessel. Once overboarded, the pile is lowered into the sea next to the vessel.

Lifting these heavy loads over the side of the vessel, also referred to as overboarding, requires the vessel to be stabilised, to prevent the hull of the vessel from tilting sideway, also referred to as rolling, during the installing procedure. Typically, ballast tanks are used to compensate for load supported by the crane, and to thus keep the floating vessel level. It is submitted that when a load is moved over the stern instead of over the side, i.e. port or starboard side the movement of the load may influence the pitch of the vessel. However, with an elongated vessel this effect on the pitch of the vessel is much less than the effect on the roll of the vessel.

The lifting and lowering of long piles makes that the boom is mainly in a raised, substantially vertical, position. In this raised position, the boom is relatively close to the crane structure.

A sudden reduction in load, e.g. by a sudden reduction in load, e.g. by partial loss of the load supported by the crane, may cause the boom to be lifted further upwards. The lift is caused by the release of bending and stretching forces in the crane, in particular the boom and the wires supporting the boom.

Furthermore, in case of a floating vessel, the effect of a reduction in load supported by the crane may cause the mobile ballast of the vessel to tilt the vessel, and thus the crane, into a slanted position. Mobile ballast, typically in the form of ballast tanks, is used to counter balance a load supported by the crane on a floating vessel. In particular when moving a load over the side of an elongated vessel. The reduction in load supported by the crane, makes the mass of the ballast tanks tilt the vessel, which tilts the crane, and thus moves the boom of the crane upwards relative to the horizontal Thus, the loss of load supported by a crane, may, due to release of tension and bending forces in the crane and/or by the mobile ballast of the vessel no longer being balanced by the load, cause the boom of the crane to collide with the crane structure and/or with parts of the vessel, causing damage to the crane, the vessel and the boom of the crane in particular.

Furthermore, when the boom is in a raised position, the loss of load may cause the boom to pivot into, or beyond, a vertical upright position. Once the boom has pivoted beyond the vertically upright position, it can no longer be supported by the luffing system. The boom will therefore collide with the crane structure and/or the vessel. In is furthermore noted that, when the boom is positioned close to the upright position, the weight of the luffing wires may pull the boom into, or beyond the vertically upright position. Furthermore, when the boom is in an upright, or in a near upright position, gravity no longer effectively pulls the boom in a downward direction. Thus, the boom may get stuck in this position.

Furthermore, in particular in case of a sudden loss of load, or a sudden movement of a vessel caused e.g. by a freak wave, the dynamic movement of the boom may cause slack in the wires of the luffing system and/or the hoisting system, and may even cause these wires to run off their sheaves.

It is observed that herein, roll is defined as the tilting rotation of a vessel about its longitudinal axis (front-back or bow-stern) axis. Furthermore, rolling motion towards a steady state (or list) angle due to the ship's own weight distribution is referred to as heel. List refers to an unintentional or unexpected offset, as caused by flooding, shifting cargo, etc.

Roll is typically in play when overboarding and lifting a load along a side of the vessel, e.g. at starboard or port side of the vessel. The ballast system of the vessel is used to counter the roll of the vessel, and to keep the vessel level. Loss of load may cause the vessel to end up in a listed position, in which the vessel is inclined to port side or starboard side.

According to a first aspect, the present invention aims to provide an improved heavy lift crane for use on an offshore vessel or at least an alternative for existing cranes for such use. It is a further object of the invention to provide crane that is more capable to handle a loss of load, or at least is less susceptible to damage caused by loss of load. It is yet a further object of the invention to provide an offshore crane vessel that is more capable to handle a loss of load, or at least is less susceptible to damage caused by loss of load.

The present invention achieves said aim by providing a heavy lift crane comprising:

- a base structure, wherein the base structure is adapted to be mounted to, or formed integral with, the vessel;
- a crane structure, wherein the crane structure is rotationally supported by the base structure for rotation of the crane structure relative to the base about a vertical rotation axis;
- a boom, preferably having a length of 80-200 meters, wherein the boom comprises a longitudinal axis, a pivot end, a mid-section, and a hoisting end opposite the pivot end, wherein the boom is supported by the crane structure, so that the boom can rotate about the vertical rotation axis, and wherein the pivot end of the boom is pivotably connected to the crane structure, so that the boom can pivot up and down about a horizontal boom pivot axis;
- a boom luffing assembly, wherein the luffing assembly comprises a boom luffing wire and a boom luffing winch, wherein the boom luffing wire extends from the boom luffing winch to the hoisting end of the boom, for pivoting the boom upward and downward about the pivot axis, and for supporting the boom in a hoisting position relative to the crane structure;

wherein the luffing assembly can pivot the boom into a top zone, preferably in the top zone the angle of the boom with the vertical rotation axis of the crane is in the range of 0-30 degrees, preferably is in the range of 0-25 degrees, most preferably is in the range of 5-25 degrees;

- a hoisting assembly for hoisting a load, wherein the hoisting assembly comprises a hoisting winch, a hoisting wire, and a load suspension device, wherein the hoisting wire extends from the hoisting winch via a hoisting wire guide, located at the hoisting end of the of the boom, to the load suspension device;
- a hydro-pneumatic boom restrainer, for reducing upward pivoting of the boom, when the boom is in the top zone, wherein the boom restrainer comprises:
  - multiple hydraulic cylinders, each having a hydraulic circuit and a cylinder rod with a cylinder head, wherein the cylinders are mounted on the crane structure with the cylinder heads directed towards the boom of the crane, preferably are mounted on a stay of the crane structure,
  - a catcher for each cylinder, wherein each catcher is mounted on the boom and is configured for receiving the cylinder head of the corresponding cylinder, and to lock the cylinder head, preferably pivotable locks the cylinder head, relative to the boom, when the boom pivots upwards in the top zone;
  - a gas buffer for each cylinder, wherein each gas buffer is mounted to the corresponding cylinder, and is connected to the hydraulic circuit of the corresponding cylinder via a medium separator, wherein the gas buffer forces the cylinder in an extend position, and wherein the volume ratio between the cylinder and the buffer is such that the cylinder acts as a progressive spring, e.g. the buffer has a size in the range of 1000-1400 liter, for example 1200 liter and the cylinders have a size in the range of 800-1000 liter, for example 900 liter, and preferably the ratio between the volume of the gas buffer and the volume of the cylinder is 4:3; and
  - a control system; comprising one or more sensors to monitor loss of a load, e.g. sensors for monitoring movement of the cylinder rods of the hydraulic cylinders, for monitoring tension in the hoisting wire, for monitoring tension in the luffing wire, formonitoring monitor roll of the vessel;

wherein the boom restrainer can be switched between a passive modus, in which it allows for movement of the cylinder rods in the respective cylinders, and thus allows for movement of the boom relative to the crane structure or the mast of the crane in the top zone, and an active modus, in which it slows down and preferably blocks movement of the cylinder rods in the respective cylinders, and thus slows down and preferably blocks movement of the boom relative to the crane structure or the mast of the crane in the top zone, and wherein the control system is configured to switch the boom restrainer from the passive modus into the active modus when the one or more sensors register a loss of load and/or roll of the vessel.

The invention provides a heavy lift crane comprising a boom restrainer. The boom restrainer resiliently engages the boom, when the boom is moved into the top zone. The cylinders of the boom restrainer are forced into the extend position. Thus, when the boom pivots upwards and engages the cylinders, the cylinders provide a resilient force that pushes the boom in the downward direction.

According to the first aspect of the invention, the boom restrainer engages the boom when the boom is pivoted into the top zone. Thus, when the boom is in the top zone it is engaged by the boom restrainer, and when it is lowered out of the top zone, the boom restrainer disengages the boom. According to the invention, the top zone overlaps with the working zone of the crane. In an embodiment, the boom restrainer engages the boom when the boom is at an angle of 40 degrees or less, preferably of 30 degrees or less, for example 25 degrees or less. In a further embodiment, in the top zone the angle of the boom with the vertical rotation axis of the crane is in the range of 0-30 degrees, preferably is in the range of 0-25 degrees, most preferably is in the range of 5-25 degrees.

The boom restrainer is provided with a control system; comprising one or more sensors to monitor loss of a load, e.g. sensors monitoring movement of the cylinder rods of the hydraulic cylinders, tension in the hoisting wire and/or in the luffing wire, and/or one or more sensors to monitor roll of the vessel.

The control system is configured to switch the boom restrainer from the passive modus into the active modus when the one or more sensors register a loss of load and/or roll of the vessel.

In the passive modus, the boom restrainer allows for movement of the cylinder rods in the respective cylinders, and thus allows for movement of the boom relative to the crane structure or the mast of the crane in the top zone In the active modus, the boom restrainer slows down and preferably blocks movement of the cylinder rods in the respective cylinders, and thus slows down and preferably blocks movement of the boom relative to the crane structure or the mast of the crane in the top zone, and In the passive modus, the cylinders are subjected to the force of the gas buffer. When the control system switches the boom restrainer into the active position, the hydraulic fluid of the system is throttled to thus increase the force required to push the cylinders into the retracted position. Thus, the movement of the boom in the upwards directions is reduced and preferably is stopped.

When the boom is pivoted further upwards into the top zone, the luffing system has to overcome the resilient force of the boom restrainer. Thus, the luffing wires are tensioned by the boom restrainer. The progressive resilient force of the cylinders makes that, when the boom is in a higher position, more force is needed to pivot the boom upwards. Thus, an upward force caused by the loss of a load will be more dampened by the boom restrainer, when the boom is in a higher position, i.e. at a smaller angle to the vertical rotation axis of the crane.

Also, in case of a loss of load, the effect of the tension release of the luffing wires, potentially causing an upward movement of the boom, is reduced due to the luffing wires being tensioned by the boom restrainer.

Thus, according to the first aspect of the inventio, the boom restrainer is configured to reduce, preferably block, upward pivoting of the boom relative to the crane, when the boom is in a top zone in case of a loss of load supported by the crane.

The boom restrainer engages the boom when the boom is positioned in the top zone. In the top zone, loss of load, possibly in combination with mobile ballast distribution of the vessel, may cause a pivotal movement of the boom that is sufficient for the boom to end up in an upright or near upright position and to collide with the crane structure or vessel.

The range of the top zone is particular for a crane design, and for the design of the vessel on which the crane is to be mounted. Depending on the design of the crane, in particular the weight of the boom and the load the crane is capable of lifting, and the vessel, in particular the width of the vessel and the possible load distribution of the mobile ballast, the top zone may vary between types and designs of cranes.

Also, the design of the boom restrainer may influence the range of the top zone. When the boom restrainer is provided with a large spring rate, the top zone may be more narrow. However, according to the invention, the boom restrainer is designed to be active over a relatively large range, and to already engage the boom when the boom is still in a work zone. This in contrast with traditional boom stops which are designed to work over a narrow range and typically engage the boom when it is close to an upright position, for example is at an angle of 6 degrees with the vertical. Furthermore, these traditional boom stops are provided adjacent the work zone, i.e. the boom is not positioned in the top zone during normal use for lifting loads, or only overlaps with a very small range of the work zone, for example overlaps only an angle of some degrees, for example an angle of 3 or 4 degrees with the working zone In addition, boom restrainer may be designed such that it blocks upward movement of the boom of the crane prior to being in a fully upright position, for example blocks upward movement of the boom when the boom is at an angle of 5 degrees with the vertical rotation axis of the crane. Thus, even the roll of the vessel is five degrees, the boom will not pass through the upright position.

According to an embodiment of a first aspect of the invention, when the boom is in the top zone, the angle of the boom with the vertical rotation axis of the crane is in the range of 0-30 degrees, preferably is in the range of 0-25 degrees, most preferably is in the range of 5-25 degrees. For example, if the boom restrainer first engages the boom when the boom is pivoted upwards at an angle of 25 degrees with the vertical, the top zone starts at that position of the boom. The boom is thus in the top zone when it is at an angle of 25 degrees or less with the vertical rotation axis.

According to the invention, the top zone has a large range, i.e. preferably at least covers an angle of over 16 degrees, for example an angle of 18 degrees, preferably covers and angle of at least 20 degrees.

Furthermore, with a heavy lift crane according to the first aspect of the invention, the boom of the crane can be pivoted in a working zone that overlaps with the top zone. The working zone comprises the range of boom positions, that allow for controlled lifting loads with the crane.

In an embodiment, the boom of the crane can be pivoted in a working zone, in which working zone for example the angle of the boom with the vertical rotation axis of the crane is between degrees and 100 degrees with the vertical rotation axis of the crane, and wherein the top zone overlaps with the working zone.

In an embodiment, in the working zone the angle of the boom with the vertical rotation axis of the crane is between 5 degrees and 100 degrees with the vertical rotation axis of the crane, and wherein the top zone overlaps with the working zone. In such an embodiment, a top zone that extends over an angle of 5 degrees to 25 degrees with the vertical rotation axis fully overlaps with the working zone. In an alternative embodiment, the top zone extends over an angle of 5 degrees to 25 degrees with the vertical rotation axis and the work zone extends over an angle of 7 degrees to 100 degrees with the vertical rotation axis. In such an embodiment, the top zone partially overlaps with the working zone. It is submitted that according to the first aspect of the invention, the top zone always at least partially overlaps with the working zone, more in particular at least the main part of the top zone overlaps with the working zone of the crane.

By providing a crane with a boom retainer according to the first aspect of the invention, in case of a loss of load, significant upwards pivoting of the boom caused by the release of bending and tension forces in the crane and/or by roll of the vessel, is reduced, preferably prevented.

Also, when the vessel pivots into an inclined position, e.g. roll into a listed position, the crane, and therefore the boom of the crane, pivot with the vessel into the inclined position. When the roll of the vessel slows down, and eventually stops, the boom retainer makes the boom slow down, and thus prevents the kinetic energy of the boom from keeping the boom pivoting in a direction towards the crane structure.

Furthermore, in case the vessel, after it has rolled into its maximum inclined position, starts to roll in the opposite direction, i.e. back towards its initial position, the boom retainer preferably also makes the boom move with this return roll of the vessel. Thus, the boom retainer prevents the boom from being lifted upwards, i.e. towards the crane structure, due to the vessel pivoting towards the boom.

Thus, providing crane with the boom retainer according to the invention reduces the chance of the luffing wires and/or the hoisting wires running from their sheaves, and of the boom colliding with the crane structure and/or parts of the vessel. Therefore the boom retainer reduces the chance of loss of load causing major damage to the boom, the crane and the vessel.

It is submitted that, according to the first aspect of the invention, the boom restrainer is coupled with both the crane structure and the boom, while the boom is in the top zone. This enables the boom restrainer to quickly reduce, preferably block movement, of the boom in case of load loss. Furthermore, because the boom restrainer reduces the upwards pivot movement of the boom, in case of a loss of load, it reduces slack in the luffing wires due to the upwards movement and prevents a subsequent fall back of the boom, causing a peak load in the luffing system, in particular the luffing wires. Thus, by providing crane with the boom retainer according to the first aspect of the invention reduces the chance of the luffing wires and/or the hoisting wires running from their sheaves, and of the boom colliding with the crane structure and/or parts of the vessel. Therefore the boom retainer reduces the chance of loss of load causing major damage to the boom, the crane and the vessel.

It is submitted that, according to the first aspect of the invention, the boom restrainer is coupled with both the crane structure and the boom, while the boom is in the top zone. This enables the boom restrainer to quickly reduce, preferably block movement, of the boom in case of load loss.

In contrast with a traditional boom stop, the boom restrainer according to the inventio operates in the working range of the crane. A traditional boom stop is configured to engage a boom when it moves out of the working area. In an embodiment of a crane according to the invention, a traditional boom stop may be combined with a boom restrainer. Thus, in such an embodiment one or more boom stop cylinders may be provided that engage the boom when it is at an angle of 8 degrees with the vertical rotation axis of the crane, and that are fully retracted when the boom is at an angle of 5 degrees with the vertical rotation axis of the crane.

When in such an embodiment the crane is used for lifting a load in the top zone, the crane is operated in the boom working area. The boom is engaged by the boom restrainer when in the top zone, but is away from a traditional boom stop. In case of loss of load, the boom retainer reduces the extent to which the boom can pivot upward relative to the crane, preferably prevents any substantial pivoting upwards of the boom in case of loss of load, and the boom preferably is held in substantially the same position as it was while supporting the load. In case the boom reaches the top end of the top zone, it is engaged by the boom stop as well. The boom stop further reduces movement of the boom and finally blocks further movement of the boom.

In an embodiment, the crane according to the first aspect of the inventio is furthermore provided with a boom stop, wherein the boom stop is configured to block movement of the boom at a safety angle, the safety angle being the maximum height wherein the boom can be pivoted, for example is at the upper end of the working zone.

It is noted that the top zone may end at the top end of the working range of the boom of the crane, or may extend upwards beyond the working range of the crane. In case the crane is provided with a traditional boom stop, the working area, and the top zone, may end at the boom stop. In an embodiment, the boom stop may be provided upwards of the actual working range of the crane, providing an additional range in which the boom can be moved, and/or into which the boom can be pivoted by the luffing system when not supporting a load, prior to be physically stopped by the boom stop.

In a further embodiment, the boom stop comprises a crush zone, configured to slow down and preferably stop a boom by controlled deformation, for example when the boom moves beyond a maximum working angle, for example moves beyond the upper end of the working zone.

In an embodiment, the boom restrainer is provided with a crush zone, i.e. is mounted or comprises a structure that is configured to slow down and preferably stop a boom by controlled deformation, when the boom moves beyond the upper end of the top zone. In a further embodiment, the crane is furthermore provided with a boom stop, and both the boom stop and the boom retainer are provided with a crush zone to stop movement of the boom.

In a further embodiment, the boom stop comprises a bumper, e.g. hydraulic cylinders, that engage the boom prior to the boom reaching a maximum working angle, to resiliently receive the boom and prevent the boom from coming to a hard stop against the boom stop.

In a further embodiment, the boom stop comprises sensors, for example in the bumper, e.g. in the form of hydraulic cylinders, that are linked to the control system, and wherein the control system is configured to block the luffing system from further lifting the boom, thus preventing the luffing system from pivoting the boom beyond the maximum working angle.

According to the first aspect of the invention, the boom restrainer is configured to be used with heavy lift cranes, i.e. crane configured to lift heavy loads e.g. for lifting loads of larger than 1000 mt, for example 1300 mt. these cranes typically have large booms, i.e. booms having a length of 80 meters or more. According to the first aspect of the invention, the boom restrainer is positioned on the crane structure to engage the pivot end of the boom, i.e. the lower end of the boom. In an embodiment, the boom restrainer engages the boom at the lower 20% of the boom, preferably within the lower 15% of the boom. Thus, of the boom is 100 m long, the boom restrainer engages the boom in the lower 15 m.

In an embodiment of a heavy lift crane according to the invention, the crane structure is provided with one or more bumpers that are configured to engage the boom, preferably an impact zone on the boom, when the boom pivots beyond a maximum working angle. The bumpers may be resilient, for example comprising hydraulic cylinders, and/or may be configured to deform upon contact, or at least upon contact when the boom moves above a certain speed, and thus act similar to a crush zone.

In an embodiment, in addition or as an alternative, the boom is provided with one or more bumpers that are configured to engage the crane structure and/or the mast of the crane, preferably an impact zone on the crane structure or the mast of the crane, when the boom pivots beyond a maximum working angle. The bumpers may be resilient, for example comprising hydraulic cylinders, and/or may be configured to deform upon contact, or at least upon contact when the boom moves above a certain speed, and thus act similar to a crush zone.

According to the first aspect of the invention, the boom restrainer comprises hydraulic cylinders, and the boom restrainer is configured to keep the cylinder at a minimum pressure such that the cylinders are forced into the extended position. By forcing the cylinders in the extended position the restrainer keeps contact with the boom when the boom pivots in the downward direction, for example suddenly pivots away from the restrainer.

In such an embodiment, the boom restrainer moves with the boom in the top zone. The bias in the boom restrainer ensures that there is a firm contact between the boom restrainer and the boom.

In an embodiment of a heavy lift crane according to the invention, the boom restrainer is provided with a control system that is configured to adjust the spring constant of the cylinders, and thus switch between slowing down of the boom and blocking the boom movement of the boom.

In an embodiment of a heavy lift crane according to the invention, the boom restrainer is comprises a crush zone, configured to slow down and stop a boom by controlled deformation, when the boom moves above a maximum pivot speed.

In a further embodiment wherein the boom restrainer comprises a crush zone, configured to slow down and stop a boom by controlled deformation, when the boom moves above a maximum pivot speed that is too high for the boom restrainer to slow down the boom prior to the boom receiving a maximum working angle, given the angle at which the boom restrainer is switched into the active modus.

In an embodiment, the hydraulic control system of each cylinder is provided with one or more valves between the medium separator and the hydraulic circuit, which one or more valves allow for a free flow of hydraulic fluid and thus for the cylinder to be biased by the gas buffer, when the boom restrainer is in de passive modus, and which one or more valves throttle the flow of hydraulic fluid when the boom retainer is in de active modus, to thus impede movement of the piston towards the retracted position, and thus slow down movement of the boom, more in particular slow down a sudden increase in movement of the boom.

the passive modus, the cylinders are subjected to the force of the gas buffer. When the control system switches the boom restrainer into the active position, the hydraulic fluid of the system is throttled to thus increase the force required to push the cylinders into the retracted position. Thus, the movement of the boom in the upwards directions is reduced and preferably is stopped.

In a further embodiment, the hydraulic circuit is configured such that the throttle function only works for the cylinder rods being pushed inwards, and not for the cylinder rods moving towards the extended position. Thus, when the boom is moved in the downward direction, the gas buffer pushes the cylinder towards the extended position and thus keeps the boom restrainer pushing against the boom moving downward. Thus, the boom restrainer can help to push the boom quickly towards a lower position, and in case the boom starts moving upwards again quickly react and again slow down the boom. Furthermore, the boom restrainer thus reduces the chance of the hoisting wires and luffing wires running of the guiding sheaves.

In an embodiment, the hydraulic circuits of the multiple cylinders are coupled, to equalize load differences between the cylinders.

In an embodiment according to the invention, the cylinders of the boom retainer are compressed when the boom is pivoted upwards in the top zone, and the hydraulic cylinders, preferably being configured to act as linear springs, thus tension the luffing wires.

In an embodiment, the cylinder rods of the boom restrainer are fully extend when they engage boom and the boom is at an angle of 35 degrees with the vertical rotation axis.

In an embodiment, the cylinder rods of the boom restrainer are fully retracted when the boom is at an angle of 15 degrees with the vertical rotation axis.

In an embodiment, the boom is an A-frame boom, and the boom restrainer comprises four cylinders that are mounted such that each engages a side of a leg of the A-frame. This distribution of the cylinders is optimal for preventing torsion in the boom. In addition, the hydraulic circuits of the cylinders are preferably coupled to balance the force exerted by the hydraulic cylinders onto the boom In an embodiment, the boom at the base end comprises a box frame, and the catchers for the cylinders are mounted on the box frame. This configuration allows for an optimal distribution of force from the hydraulic cylinders to the boom.

In an embodiment, the spring rate of the cylinder, when the cylinder rod is moved from an extended position to a retracted position increases at least 15% preferably at least 20%, for example 25%.

In an embodiment, the cylinders are pivotable supported, such that they can pivot about a horizontal axis relative to the crane structure. Thus the angle of engagement of the cylinders, more in particular the cylinder rods, relative to the boom can be adapted while the boom moves in the top zone.

In an embodiment, the stay is an A-frame, and two cylinders are mounted on each leg of the A frame, and preferably the luffing wires pass between two sets of cylinders, when the boom is in a lowered position.

In an embodiment, the catchers comprises a guide surface and a blocking surface, and wherein the guide surface engages the cylinder head when the boom pivots towards the top zone, and guides the cylinder head towards the blocking surface while the boom pivots further towards the top zone, for example is raised over an angle in the range of 1-3 degrees, for is raised over an angle of 2 degrees, and wherein the blocking surface is provided at an end of the guide surface to lock the cylinder head relative to the boom, such that further moment of the boom pushes the rod into the cylinder.

In an embodiment, the boom restrainer comprises an interface that enables an operator switch the boom restrainer between the passive modus and the active modus.

In an embodiment, the control system comprises sensors for monitoring the angle of the boom, and/or that can detect of the boom is within the top zone or not.

In an embodiment, the crane is a pedestal crane, the crane structure comprising a stay for supporting the luffing wires, and wherein the boom restrainer is preferably mounted to the stay. In an alternative embodiment, the crane is a mast crane and the boom restrainer is mounted on the crane structure of the mast crane.

The first aspect of the invention furthermore provides an offshore crane vessel provided with a heavy lift crane according to the invention.

The first aspect of the invention furthermore provides a hydro-pneumatic boom restrainer configured to be mounted on a heavy lift crane to provide a heavy lift crane according to the invention.

The first aspect of the invention furthermore provides a method for stopping the upwards pivot movement of a boom, the boom moving in the top zone, using a heavy lift crane according to the invention, or a vessel according to the invention, wherein the method comprises the steps:

Raising the boom into the top zone and engaging the boom with the boom restrainer;

Lifting a load with the crane;

Detecting a loss of load;

Switching the boom restrainer from the passive modus into the active modus;

Slowing down movement of the cylinder rods in the respective cylinders, and thus slowing down movement of the boom relative to the crane structure or the mast of the crane;

Preferably, stopping movement of the cylinder rods in the respective cylinders, and thus stopping movement of the boom, relative to the crane structure or the mast of the crane.

The first aspect of the inventio furthermore provides a crane for use on a vessel, the crane comprising:

a base structure, wherein the base structure is adapted to be mounted to, or formed integral with, the vessel;

a crane structure, wherein the crane structure is rotationally supported by the base structure for rotation of the crane structure relative to the base about a vertical rotation axis;

a boom, wherein the boom comprises a longitudinal axis, a pivot end, a mid-section, and a hoisting end opposite the pivot end, wherein the boom is supported by the crane structure, so that the boom can rotate about the vertical rotation axis, and wherein the pivot end of the boom is pivotably connected to the crane structure, so that the boom can pivot up and down about a horizontal boom pivot axis;

a boom luffing assembly, wherein the luffing assembly comprises a boom luffing wire and a boom luffing winch, wherein the boom luffing wire extends from the boom luffing winch to the hoisting end of the boom, for pivoting the boom in a working zone upward and downward about the pivot axis, and for supporting the boom in a hoisting position relative to the crane structure, and wherein the luffing assembly can pivot the boom into a top zone which top zone overlaps with an upper end of the working zone, a hoisting assembly for hoisting a load, wherein the hoisting assembly comprises a hoisting winch, a hoisting wire, and a load suspension device, wherein the hoisting wire extends from the hoisting winch via a hoisting wire guide, located at the hoisting end of the of the boom, to the load suspension device;

a hydro-pneumatic boom restrainer, for reducing upward pivoting of the boom, when the boom is in the top zone, wherein the boom restrainer comprises:

multiple hydraulic cylinders, each having a hydraulic circuit and a cylinder rod with a cylinder head, wherein the cylinders are mounted on the crane structure with the cylinder heads directed towards the boom of the crane, a catcher for each cylinder, wherein each catcher is mounted on the boom and is configured for receiving the cylinder head of the corresponding cylinder, and to pivotable locks the cylinder head relative to the boom, when the boom pivots upwards in the top zone;

a gas buffer for each cylinder, wherein each gas buffer is mounted to the corresponding cylinder, and is connected to the hydraulic circuit of the corresponding cylinder via a medium separator, wherein the gas buffer forces the cylinder in an extend position, and wherein the volume ratio between the cylinder and the buffer is such that the cylinder acts as a progressive spring; and a control system; comprising one or more sensors to monitor loss of a load;

wherein the boom restrainer can be switched between a passive modus, in which it allows for movement of the cylinder rods in the respective cylinders, and thus allows for movement of the boom relative to the crane structure or the mast of the crane in the top zone, and an active modus, in which it slows down and preferably blocks movement of the cylinder rods in the respective cylinders, and thus slows down and preferably blocks movement of the boom relative to the crane structure or the mast of the crane in the top zone, and wherein the control system is configured to switch the boom restrainer from the passive modus into the active modus when the one or more sensors register a loss of load and/or roll of the vessel.

According to a second aspect, the present invention aims to provide an improved heavy lift crane for use on an offshore vessel or at least an alternative for existing cranes for such use. It is a further object of the invention to provide crane that is more capable to handle a loss of load, or at least is less susceptible to damage caused by loss of load. It is yet a further object of the invention to provide an offshore crane vessel that is more capable to handle a loss of load, or at least is less susceptible to damage caused by loss of load.

The present invention achieves said aim by providing a crane according to claim the second aspect.

According to the second aspect, a heavy lift crane according to the invention comprises:

a base structure, wherein the base structure is adapted to be mounted to, or formed integral with, the vessel;

a crane structure, wherein the crane structure is rotationally supported by the base structure for rotation of the crane structure relative to the base about a vertical rotation axis;

a boom, having a length of 80-200 meters, wherein the boom comprises a longitudinal axis, an pivot end, a mid-section, and a hoisting end opposite the pivot end, wherein the boom is supported by the crane structure, so that the boom can rotate about the vertical rotation axis, and wherein the pivot end of the boom is pivotably connected to the crane structure, so that the boom can pivot up and down about a horizontal boom pivot axis;

a boom luffing assembly, wherein the luffing assembly comprises a boom luffing wire and a boom luffing winch, wherein the boom luffing wire extends from the boom luffing winch to the hoisting end of the boom, for pivoting the boom upward and downward about the pivot axis, and for supporting the boom in a hoisting position relative to the crane structure;

a hoisting assembly for hoisting a load, wherein the hoisting assembly comprises a hoisting winch, a hoisting wire, and a load suspension device, wherein the hoisting wire extends from the hoisting winch via a hoisting wire guide, located at the hoisting end of the of the boom, to the load suspension device;

a boom restrainer, for reducing, preferably blocking, upward pivoting of the boom, when the boom is in a top zone, in which top zone the angle of the boom with the vertical rotation axis of the crane is 40 degrees or less, preferably is 50 degrees or less, most preferably is 60 degrees or less, wherein the boom restrainer comprises:

a first member for engaging, preferably being connected with, the crane structure or a mast of the crane, when the boom is in the top zone;

a second member, for engaging, preferably being connected with, the boom, when the boom is in the top zone;

a control system; comprising one or more sensors to monitor loss of a load, e.g. sensors monitoring tension in the hoisting wire and/or in the luffing wire, and/or one or more sensors to monitor roll of the vessel;

wherein the boom restrainer can be switched between a passive modus, in which it allows for movement of the second member relative of the first member, and thus allows for movement of the boom relative to the crane structure or the mast of the crane, and an active modus, in which it slows down and preferably blocks movement of the second member relative to the first member, and thus slows down and preferably blocks movement of the boom relative to the crane structure or the mast of the crane, and wherein the control system is configured to switch the boom restrainer from the passive modus into the active modus when the one or more sensors register a loss of load and/or roll of the vessel.

Thus, the invention provides a heavy lift crane comprising a boom and a boom restrainer. The boom restrainer is configured for reducing, preferably blocking, upward pivoting of the boom relative to the crane, when the boom is in a top zone in case of a loss of load supported by the crane.

The restrainer according to the second aspect of the invention can at least be used when the boom is positioned in the top zone, i.e. when the angle of the boom with the vertical rotation axis of the crane is 40 degrees or less, preferably is 50 degrees or less, most preferably is 60 degrees or less. In the top zone, a relative minor pivotal movement of the boom may cause the boom to collide with the crane structure or vessel.

In contrast with a traditional boomstop, the restrainer according to the second aspect of the invention operates in the working range of the crane. A traditional boomstop is configured to engage a boom when it moves out of the working area. In an embodiment of a crane according to the invention, a traditional boomstop may be combined with a boom restrainer.

When the crane is used for lifting a load, the crane is operated with the boom in the working area. Thus, the boom is away from a traditional boom stop. In case of loss of load, the boom retainer is reduces the extent to which the boom can pivot upward relative to the crane, preferably prevents any pivoting upwards of the boom in case of loss of load.

The boom preferably is held in substantially the same position as it was while supporting the load.

Thus, by providing a crane with a boom retainer according to the second aspect of the invention, in case of a loss of load, pivoting upwards of the boom caused by the release of bending and tension forces in the crane and/or by roll of the vessel, is reduced, preferably prevented.

Also, when the vessel pivots into an inclined position, e.g. roll into a listed positon, the crane, and therefore the boom of the crane, pivot with the vessel into the inclined position. When the roll of the vessel slows down, and eventually stops, the boom retainer makes the boom slow down, and thus prevents the kinetic energy of the boom from pivoting the boom in an upward direction, more in particular in a direction towards the crane structure.

Furthermore, in case the vessel, after it has rolled into its maximum inclined position, starts to roll in the opposite direction, the boom retainer according to the second aspect of the invention preferably also makes the boom move with this return roll of the vessel. Thus, the boom retainer prevents the boom from being lifted upwards, i.e. towards the crane structure, due to the vessel pivoting towards the boom.

Thus, by providing crane with the boom retainer according to the second aspect of the invention reduces the chance of the luffing wires and/or the hoisting wires running from their sheaves, and of the boom colliding with the crane structure and/or parts of the vessel. Therefore the boom retainer reduces the chance of loss of load causing major damage to the boom, the crane and the vessel.

Furthermore, the boom restrainer also prevents the boom from being pivoted upwards, beyond the position in which it is supported by the luffing wires. And thus may also prevent a subsequent fall back of the boom, causing a peak load in the luffing system, in particular the luffing wires.

It is submitted that, according to the invention, the boom restrainer preferably is coupled with both the crane structure, or the mast of the crane, and the boom, at least while the boom is in the top zone. This enables the boom restrainer to quickly reduce, preferably block movement, of the boom upon activation.

It is noted that when a component of the boom restrainer is said to be connected to or to be supported by the mast of the crane, it is considered to be connected to or to be supported by the mast, not by the crane structure, more in particular is considered to be rotatable connected to or to be rotatable supported by the mast, such that the component can rotate with the crane structure and the boom of the crane in unison.

For example, in a mast crane, the luffing wire, more in particular sheaves supporting the luffing wires, are typically rotatable supported at the top of the mast. Furthermore, a boom stop may also be provided at the top of the mast, such that it rotates with the sheaves of the luffing system, and with the crane structure, c.q. the boom of the crane, about the vertical rotation axis of the crane.

In an embodiment of a heavy lift crane according to the invention, the boom of the crane can be pivoted in a working zone, in which working zone for example the angle of the boom with the vertical rotation axis of the crane is between 20 degrees and 100 degrees with the vertical rotation axis of the crane, and wherein the top zone overlaps with the working zone.

The working zone is the range of boom positions, that allow for lifting loads with the crane.

In an embodiment, the crane is furthermore provided with a boom stop, wherein the boom stop is configured to block movement of the boom at a safety angle, the safety angle being the maximum height wherein the boom can be pivoted, for example is at the upper end of the working zone.

It is noted that the top zone may end at the top end of the working range of the boom of the crane, or may extend upwards beyond the working range of the crane. In case the crane is provided with a traditional boom stop, the working area, and the top zone, may end at the boom stop. In an embodiment, the boom stop may be provided upwards of the actual working range of the crane, providing an additional range in which the boom can be moved, and/or into which the boom can be pivoted by the luffing system when not supporting a load, prior to be physically stopped by the boom stop.

In a further embodiment, the boom stop comprises a crush zone, configured to slow down and preferably stop a boom by controlled deformation, for example when the boom moves beyond a maximum working angle, for example moves beyond the upper end of the working zone.

In a further embodiment, the boom stop comprises a bumper, e.g. hydraulic cylinders, that engage the boom prior to the boom reaching a maximum working angle, to resiliently receive the boom and prevent the boom from coming to a hard stop against the boom stop.

In a further embodiment, the boom stop comprises sensors, for example in the bumper, e.g. in the form of hydraulic cylinders, that are linked to the control system, and wherein the control system is configured to block the luffing system from further lifting the boom, thus preventing the luffing system from pivoting the boom beyond the maximum working angle.

In an embodiment of a heavy lift crane according to the invention, the crane structure is provided with one or more bumpers that are configured to engage the boom, preferably an impact zone on the boom, when the boom pivots beyond a maximum working angle. The bumpers may be resilient, for example comprising hydraulic cylinders, and/or may be configured to deform upon contact, or at least upon contact when the boom moves above a certain speed, and thus act similar to a crush zone.

In an embodiment, in addition or as an alternative, the boom is provided with one or more bumpers that are configured to engage the crane structure and/or the mast of the crane, preferably an impact zone on the crane structure or the mast of the crane, when the boom pivots beyond a maximum working angle. The bumpers may be resilient, for example comprising hydraulic cylinders, and/or may be configured to deform upon contact, or at least upon contact when the boom moves above a certain speed, and thus act similar to a crush zone.

In an embodiment of a heavy lift crane according to the invention, the boom restrainer comprises a hydraulic cylinder, and the boom restrainer is configured to keep the cylinder at a minimum pressure, at least when the boom is in contact with the boom restrainer, such that the restrainer keeps contact with the boom when the boom suddenly pivots in the downward direction, i.e. suddenly pivots away from the restrainer.

In such an embodiment, the boom restrainer still allows for the luffing system to pivot the boom in the top zone under normal working conditions, and the boom restrainer moves with the boom in the top zone. The bias in the boom restrainer ensures that there is a firm contact between the boom restrainer and the boom. Furthermore, the bias may already dampen, or partially dampen, any upwards movement of the boom not caused by the luffing system prior to the boom restraint being activated. Thus, this pretension in the cylinder may reduce the movement the boom restrainer has reduce or block when activated, or may, in case of relatively minor upwards movement, prevent the boom restrainer from being activated.

In an embodiment of a heavy lift crane according to the invention, the control system is configured to switch between slowing down of the boom and blocking the boom movement of the boom, for example by respectively partially and fully activating brake callipers or a hydraulic cylinder in a telescopic arm.

In an embodiment of a heavy lift crane according to the invention, the boom restrainer is comprises a crush zone, configured to slow down and stop a boom by controlled deformation, when the boom moves above a maximum pivot speed.

In a further embodiment, the maximum pivot speed is too high for the boom restrainer to slow down the boom prior to the boom receiving a maximum working angle, given the angle at which the boom restrainer is switched into the active modus.

In an embodiment of a heavy lift crane according to the invention, the boom restrainer can be disconnected from the crane and/or from the boom, or wherein the first member can be moved away from the second member, when the boom is lowered below the top zone.

In an embodiment of a heavy lift crane according to the invention, the control system is configured to, once switched into the active modus, slow down movement of the boom in the upward direction as well as in the downward direction.

In an embodiment of a heavy lift crane according to the invention, the boom restrainer comprises a telescopic arm, the telescopic arm comprising the first member and the second member, wherein the second member is telescopically received in the first member, and wherein the first member is mounted on the crane structure, or the mast of the crane, with the second member directed towards the boom of the crane; and wherein the second member comprises a couple element, provided on the second member of the telescopic arm, for engaging the boom, preferably for engaging a catch provided on the boom, when the boom is pivoted into the top zone, and wherein the second member is configured to telescopically slide into the first member when the boom is pivoted into the top zone, wherein the telescopic arm furthermore is configured to, when the boom is in the top zone and the boom restrainer is in the passive modus, allow for movement of the second member relative of the first member, and to thus allow for movement of the boom relative to the crane structure or the mast of the crane, and when the boom is in the top zone and the boom restrainer is in the active modus, slow down and preferably block movement of the second member relative to the first member, e.g using brake pads or hydraulic fluid, to thus slow down and preferably block tilting movement of the boom in the upward direction relative to the crane structure or the mast of the crane.

In a further embodiment, the arm comprises at least one hydraulic cylinder and an hydraulic system coupled with the at least one hydraulic cylinder, wherein the at least one hydraulic cylinder is configured to move the second member in a linear direction relative to the first member, and wherein the control system is configured to use the hydraulic system slow down movement of the boom and/or stop movement of the boom.

It is submitted that, if activated quick enough, the boom restrainer may prevent movement of the boom. Once the boom is already moving, the system may choose to stop directly or to first slow down movement of the boom, prior to stopping movement of the boom. It is noted that in some embodiments, under certain conditions, the boom restrainer may only succeed in slowing down movement of the boom, and not in stopping the boom. This may still be enough to prevent the boom from contacting the crane, or a booms top mounted on the crane structure, to cause major damage. Because the boom restrainer is coupled with the boom while it is operated in the top zone, it is able to quickly act on a loss of load or a sudden, unexpected. increase, in the speed at which the boom pivots. Thus, the boom restrainer is capable of preventing damage to the boom in situation in which this would not be possible without the boom restrainer.

In an embodiment of a heavy lift crane according to the invention, the first member has an receiving end and the second member has a penetrating end, and wherein the penetrating end of the second member (brake plate) is configured to be at least partially inserted into the receiving end of the first member (brake callipers), wherein the first member is mounted to the crane structure with the receiving end facing the boom, and the second member is mounted on the boom with the penetrating end facing the crane structure, and wherein, when the boom is pivoted into the top zone, the penetrating end of the second member is inserted into the receiving end of the first member, and the second member slides into the first member when the boom is pivoted upwards in the top zone, wherein the first member is configured to, when the boom is in the top zone and the boom restrainer is in the passive modus, allow for movement of the second member relative of the first member, and to thus allow for movement of the boom relative to the crane structure or the mast of the crane, and when the boom is in the top zone and the boom restrainer is in the active modus, slow down and preferably block movement of the second member relative to the first member, e.g using brake pads, to thus slow down and preferably block tilting movement of the boom in the upward direction relative to the crane structure or the mast of the crane.

In a further embodiment, the first member and/or the second member are/is provided with fixating devices for engaging the second member or the first member respectively, wherein the fixating devices can be activated by the control system to reduce movement of the first member relative to the second member, and preferably stop movement of the first member relative to the second member.

In an embodiment of a heavy lift crane according to the invention, the first member and/or the second member comprises fixating devices embodied as brake callipers, and wherein respectively the second member and/or the first member comprise a brake plate configured to slide between the brake callipers of the first member and/or the second member, when the boom is in the top zone.

In an embodiment of a heavy lift crane according to the invention, the second member comprises a track, wherein the track is mounted on the boom and extends along the longitudinal axis of the boom, and wherein the first member is an arm that extends between a base end and a boom end, wherein the base end of the arm is pivotably mounted on the crane structure, or to the mast of the crane, and the boom end is configured to be slideable coupled with the track, and wherein, when the boom is pivoted upward in the top range, the arm slides with its boom end upwards along the boom, wherein the first member is configured to, when the boom is in the top zone and the boom restrainer is in the passive modus, allow for the boom end of the arm to slide along the track, and to thus allow for movement of the boom relative to the crane structure or the mast of the crane, and when the boom is in the top zone and the boom restrainer is in the active modus, slow down and preferably block movement of the boom end of along the track, e.g. using brake pads or a cylinder, to thus slow down and preferably block tilting movement of the boom in the upward direction relative to the crane structure or the mast of the crane.

In a further embodiment, the boom end is configured to engage the track, or a slide mounted on the track, when the boom pivots into the top zone, and to disengage the track, or slide, when the boom is pivoted in a downward direction out of the top zone.

In a further embodiment, in addition or as an alternative, the first member is configured to engage a slide, e.g. a cart, on the track or to slidable engage the track, In an embodiment of a heavy lift crane according to the invention, the boom restrainer is at one end connected to the crane structure or the mast of the crane can be disconnected from the crane and/or from the boom, to enable a large angle between the boom and the crane structure In a further embodiment, the boom restrainer is configured to engage the boom and the crane structure when the angle of the boom with the vertical rotation axis of the crane is 40 degrees or less, preferably is 50 degrees or less, most preferably is 60 degrees or less.

In an embodiment of a heavy lift crane according to the invention, the boom restrainer comprises an interface that enables an operator switch the boom restrainer between the passive modus and the active modus.

In an embodiment of a heavy lift crane according to the invention, the control system comprises sensors for monitoring the angle of the boom, and/or that can detect of the boom is within the top zone or not.

In an embodiment of a heavy lift crane according to the invention, the crane is a mast crane.

In an alternative embodiment of a heavy lift crane according to the invention, the crane is a pedestal crane, the crane structure comprising a stay for supporting the luffing wires, and wherein the boom restrainer is preferably mounted to the stay.

The invention furthermore provides an offshore crane vessel provided with a heavy lift crane according to one or more of the preceding claims.

The invention furthermore provides a method for stopping the upwards pivot movement of a boom, the boom moving in the top zone, using a heavy lift crane according to the invention, or a vessel according to the invention, wherein the method comprises the steps:

- Lifting a load and raising the boom into the top zone;
- Detecting a loss of load;
- Switching the boom restrainer from the passive modus into the active modus;
- Engaging the second member with the first member;
- Slowing down movement of the second member, and thus the boom, relative to the first member, and thus relative to the crane structure or the mast of the crane;
- Stopping movement of the second member, and thus the boom, relative to the first member, and thus relative to the crane structure or the mast of the crane.

In an embodiment, the crane comprises a mobile mass. The mobile mass is slideably supported by the boom of the crane, such that the mass can be moved along the boom from a proximal end of the boom, located at the boom pivot axis of the boom, to a distal end of the boom. Preferably, the boom is provided with a track that extends along the boom, and the boom mass is provided with a track mounted carriage, to enable the mobile mass to be moved along the track.

Furthermore, the boom is provided with a mass drive, for example a hoisting system or a magnetic drive, configured to move the mass in a damping direction away from the proximal end of the boom and towards the distal end of the boom.

In a further embodiment, the boom is provided with a mobile mass retainment system, for securing the mobile mass in a position away from the proximal end of the boom, more in particular for preventing the mobile mass to move towards the proximal end of the boom.

In case of the boom being pivoted upwards, e.g. by a sudden loss of a load supported by the boom and/or a pivoting movement of the vessel, the mobile mass is pushed towards the distal end of the boom.

In case of the boom being pivoted upwards, e.g. by a sudden loss of a load supported by the boom and/or a pivoting movement of the vessel, the mobile mass is pushed towards the distal end of the boom. Moving the mobile mass away from the pivot axis of the boom, and optionally away from the pivot axis of the vessel, mass is transferred away from the center of gravity of the vessel, and the pivoting movement of the boom is slowed down.

In addition or as an alternative, the luffing system of the crane may be provided with a luffing release, causing the luffing to be released to such an extent that the boom is not pivoted not a tilted position, or only in a limited way.

In an embodiment, sections of the luffing wire can be looped via emergency release sheaves, which release sheaves can be moved to extend the amount of luffing wire between the crane super structure and the boom, to thus prevent pivoting of the crane structure, caused by the roll of the vessel, to pull the boom in upwards, and thus preventing passive and active lift of the boom.

In addition or as an alternative, the boom mounted sheaves block guiding the luffing wires, may be movably supported, such that in case of an emergency it can be moved along or even away from the boom, to thus prevent pivoting of the crane structure, caused by the roll of the vessel, to pull the boom in upwards, and thus preventing passive and active lift of the boom.

In an embodiment, the boom of the crane is provided with a strut structure at the lifting side of the crane, and with one or more retainer wires connected to the strut structure, for exerting a pulling force on the boom. The retainer wires are connected to a pulling device, e.g. comprising one or more hydraulic cylinders and/or one or more winches, for enacting a pulling force on the retainer wires. The strut structure sets the retainer wires away from the boom structure, to thus enable a moment force to be enacted on the boom, pulling the boom downward.

In a preferred embodiment, one or more support wires extend from the strut structure towards the top of the boom, the wires being fixed to the boom and the strut structure, to prevent excessive flexing of the boom when exerting a pulling moment on the boom using the retainer wires.

This embodiment of the boom is in particular beneficial in case the crane structure is of limited height compared to the length of the boom.

According to a third aspect, the invention provides for an offshore crane vessel, preferably comprising a heavy lift crane according to the second aspect of the invention, wherein the vessel is configured for preventing excessive roll due to loss of load.

In an embodiment, the vessel is provided with additional floating bodies, set up opposite the lifting side of the vessel, to provide the hull with a more stable set up. Thus, in such an embodiment, the hull is effectively extended in a direction away from the side at which the crane is to lift a load. Thus, the hull is better able to resist a roll of the vessel, caused by the ballast tanks, in case of a sudden loss of the load lifted by the crane.

For example, one or more pontoons can be connected to the hull of the vessel. Preferably, the pontoons are set up spaced form the hull, and are connected to the vessel via spacer arms, for example a truss construction extending between the vessel and the pontoons.

In an embodiment, in addition or as an alternative the vessel supporting the crane is provided with floating anchors for preventing excessive tilt of the vessel in case of the crane losing at least part of the load being lifted. As set out above, when a crane is used form a floating vessel for lifting a heavy load, in particular along a side of the vessel, ballast tanks are used to compensate for the load lifted by the crane to thus level the vessel. When the load, or part thereof, is lost, the weight ballast tanks tilts the vessel into a pivoted position. The altered position of the vessel, in particular the movement into the altered position, causes the boom of the crane to be lifted, and may cause the boom to be lifted into or beyond a vertically upright position.

In order to prevent the movement of the vessel, caused by the weight of the ballast tanks, to cause dynamic lift of the boom the vessel is provided with floating anchors. The floating anchors are mounted to the vessel on the side at which the load is to be supported by the crane. In case the load is partially lost, the weight of the ballast tanks will cause the vessel to roll away from the floating anchors. Even though the floating anchors will not prevent the ship from being rolled into a pivoted position, the speed at which the vessel is rolled will be reduced. This will in turn reduce the dynamic lift caused by the rolling movement of the vessel.

In a further embodiment, the floating anchors are supported by winches, which winches can be activated to reel in the floating anchor support lines at high speed. Thus increasing the pull on the floating anchors, and thus generating a pulling force counter the roll of the vessel. Preferably, a control system is provided that monitors the position of the vessel and/or the load supported by the crane, in particular by the hoisting wires of the crane. In case of a roll and/or sudden loss of load the control system can activate the winches to pull on the floating anchors and thus counteract to a roll of the vessel. The control system may also reduce the speed of the winches when the vessel, after rolling away from the side at which the load was supported, roll back towards its initial position. Thus, the control system prevents the winches form rolling the vessel into the opposite direction.

In an embodiment, the vessel is provided with hull mounted stabilisation plates, which stabilisation devices are configured to reduce the speed at which the hull of the vessel can roll in the water, i.e. reduce the speed at which the hull of the vessel can pivot about its longitudinal axis. In case of for example a partial loss of load, the ballast tanks may roll the hull of the vessel into a pivoted position. The hull mounted stabilisation plates are not provided to prevent the roll of the vessel, but aim to reduce the speed at which the vessel rolls into the pivoted position. By reducing the roll speed, the kinetic energy transferred to the boom is reduced, and therefore the dynamic lift of the boom is reduced or even eliminated. Thus, relative to the crane, the boom more or less holds the position defined by the luffing wires. The chance that the boom is pivoted into a vertical upright position is thus reduced.

The stabilisation plates provide a surface that extends in a plane perpendicular to the direction of roll of the vessel, similar to a bilge keel. To effectively reduce the speed of roll caused by a sudden loss of load, the surface of the stabilisation plates is relatively large. Therefore, the stabilisation plates have to be removed when the vessel is not used for lifting, but is travelling between locations, to not negatively influence the dynamic characteristics of the hull of the vessel. In an embodiment, the stabilisation plates can be folded alongside the hull of the vessel, or can be lifted onto the deck of the vessel. In an embodiment, the stabilisation plates are retractable, and can be folded or retracted into a recess provided in the hull of the vessel.

In an embodiment, in addition or as an alternative the vessel supporting the crane is provided with one or more devices for reducing and/or slowing down roll movements of the vessel, which roll movements are induced by a sudden loss of the load supported by the crane.

Typically, a heavy lift crane vessel is provided with a water ballast system that allows to compensate for static heel caused by the weight of the boom and suspended load during lifting operations, in particular when overboarding a load. Such a water ballast system usually comprises water ballast tanks and associated pumps in the hull of the vessel. In general the pump capacity forms a limitation on the ballast transfer, and prevents the ballast tanks to be emptied fast enough in case of a loss of load.

It is known in the prior art to stabilize a crane vessel additionally by an active roll damping mechanism. Such a mechanism actively suppresses rolling motion. Rolling motion is the rotational movement about the ship's longitudinal axis, which is generated by a wave-excited moment that periodically opposes a moment on the ship. With crane vessels even small roll moments can produce large roll excursions as a result of the load suspending from the heavy lift crane.

An example of an active roll damping mechanism is described in WO2009048322.

With a vessel according to fourth aspect of the invention, the roll damping mechanism is configured to quickly react in case of loss of load, and counteract roll motion of the vessel generated by the loss of load. A solid roll damping ballast is provided that is movable in the transverse direction of the hull, a sensor detecting a loss of load, and a drive and control system operable to cause and control the movements of the solid roll damping ballast in response to the detections of the sensor to provide roll stabilization.

During use, the solid mass of the roll damping mechanism is used to counter balance the load supported by the crane, optionally in combination with the use of ballast tanks comprising water. In case of a loss of load, the solid mass is transported quickly towards the opposite side of the vessel, to thus counteract the roll generated by the initial disbalance created by the loss of load.

In case ballast tanks are used, the solid weight is preferably moved as far as possible to the opposite side of the vessel. In case the solid weight is the main weight to counterbalance the load supported by the crane, the solid load may initially be moved to the opposite side of the vessel, but will ultimately be moved to the center of the vessel.

The solid mass can be provide on a track, which track extends perpendicular to the longitudinal axis of the vessel from one side of the vessel to the opposite side. In an embodiment, a drive is provided to quickly move the solid mass to the opposite side of the vessel, for example winches or a super capacitor. Also a pre-tensioned cylinder can be used to move the mass out of its initial positon. On the other end of the track a buffer is provided to slow down the mass. In an embodiment this can be a capacitor. As an alternative a deformable buffer can be used or a hydraulic cylinder connected to a buffer, wherein the buffer is configured to slow down the mass, without acting as a spring that after slowing down pushes the mass back.

In an alternative embodiment, the mass is configured as a fall weight, and is mounted on a curved track. In this embodiment, in case of a loss of load, the weight is released and travels downward and to the opposite side of the vessel under gravity. In a further embodiment, an additional drive may be provide to accelerate the load. At the opposite end of the track a bumper/buffer is provided to catch and slow down the mass.

Advantageous embodiments of the heavy lift crane according to the second aspect of the invention, the method according to the second aspect of the invention, and the further aspects of the invention are disclosed in the sub claims and/or in the description, in which the aspects of the invention are further illustrated and elucidated on the basis of a number of exemplary embodiments, of which some are shown in the schematic drawing. In the figures, components corresponding in terms or construction and/or function are provided with the same last two digits of the reference numbers.

The embodiments and the aspects of the invention disclosed herein can be used alone or in combination to prevent the boom of the crane to pivot upward, more in particular to prevent contact between the boom and the crane structure, more in particular prevent folding, more in particular collapse, of the boom.

Whilst primarily presented for illustrative purposes with reference to one or more of the figures, any of the technical features addressed below may be combined with any of the independent claims of this application either alone or in any other technically possible combination with one or more other technical features.

It will be appreciated by the skilled person that a technical feature discussed herein as required or as optional with respect to one embodiment of the invention may be equally applicable to one or more other embodiments described herein, with the feature performing its designation function. Such combinations are all envisaged herein unless a combination would result in a technical impossible solution and/or not meet the desired functionality.

BRIEF DESCRIPTION OF THE DRAWINGS

In the Drawings

FIG. 1 shows a first exemplary embodiment of a heavy lift crane 1 according to a second aspect of the invention in side view, wherein the crane 1 is depicted with a boom 4 in a lowered position and in a raised position.

Figure 1:
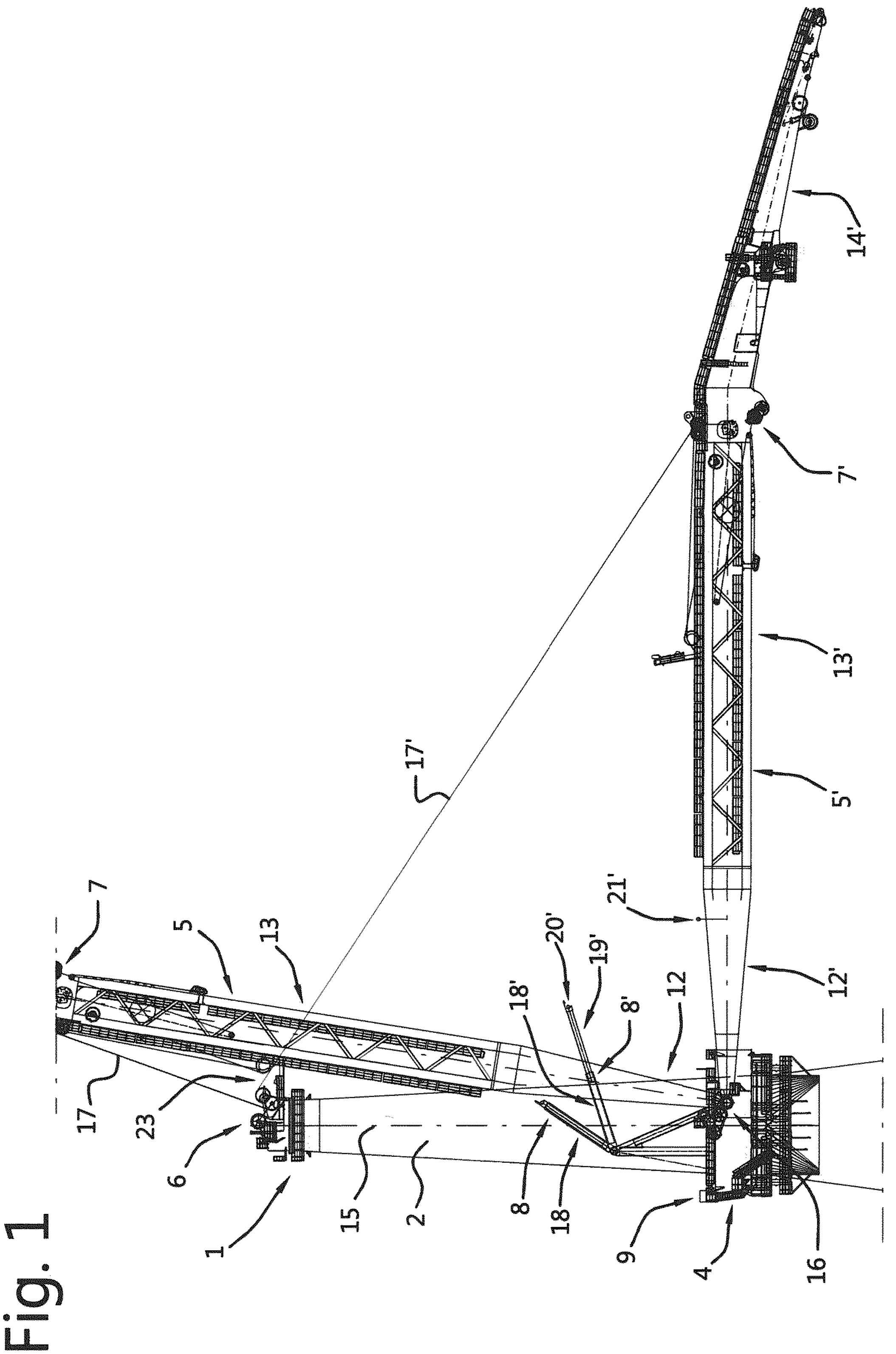
FIG. 1 shows a first exemplary embodiment of a heavy lift crane according to a second aspect of the invention in side view, wherein the crane is depicted with a boom in a lowered position and in a raised position.
Figure 2:
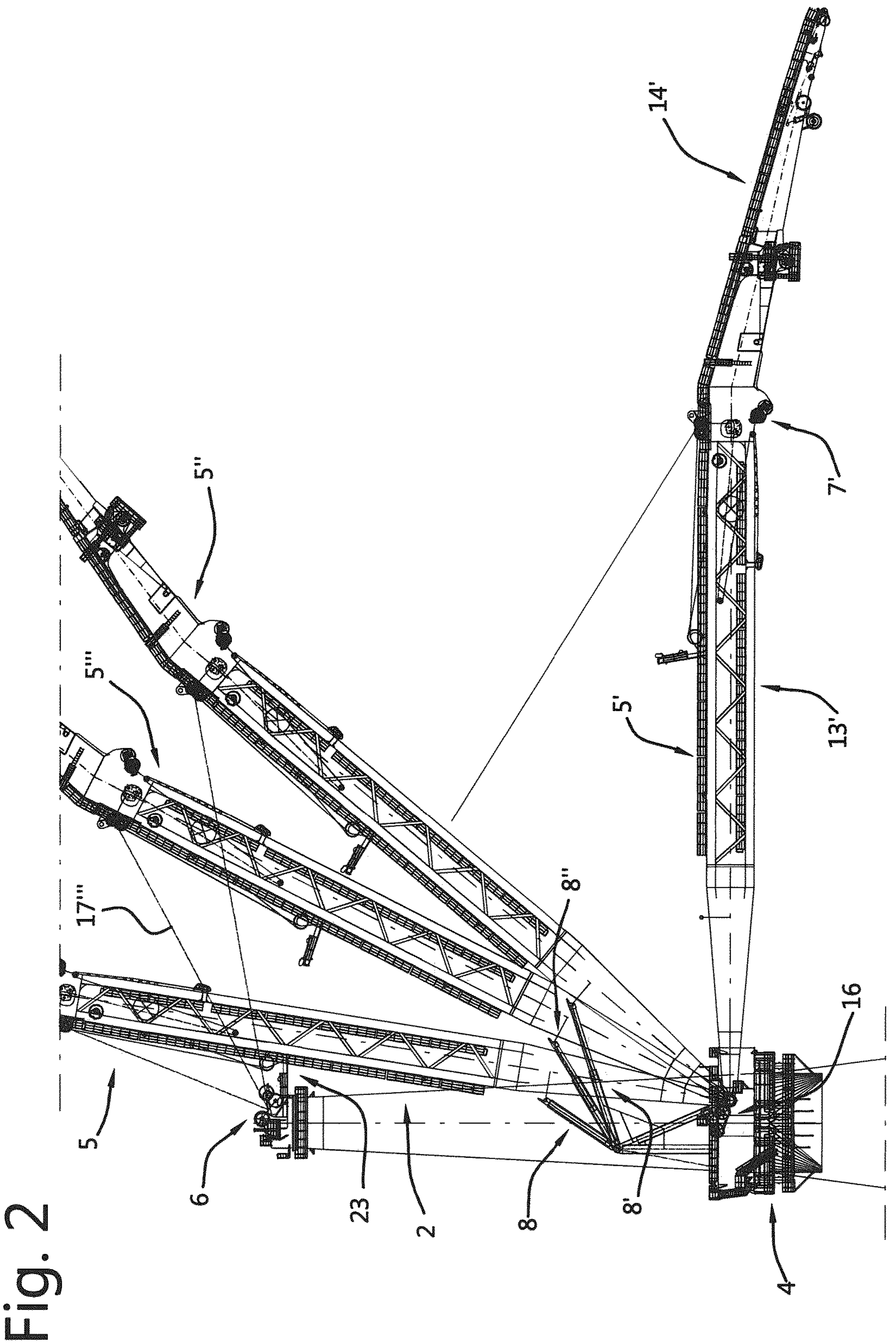
FIG. 2 shows the heavy lift crane of FIG. 1 in side view, wherein the crane is depicted with the boom in the lowered position, in the raised position, and two intermediate positions.

According to the invention, the heavy lift crane comprises a base structure 3, a crane structure 4, a boom 5, a boom luffing assembly 6, a hoisting assembly 7, a boom restrainer 8 and a control system 9. In the embodiment shown, the crane is furthermore provided with a boom stop 23.

In the embodiment shown, the heavy lift crane 1 is a mast crane, and the base structure 3 is embodied as a mast 2 the mast is adapted to be mounted to a vessel.

The crane structure 4 comprises a crane housing. The crane structure 4 is rotationally supported by the base structure, in this embodiment the mast 2 of the crane, for rotation of the crane structure relative to the base about a vertical rotation axis 15. Thus, the vertical rotation axis of the crane coincides with the vertical axis of the mast of the crane.

In the embodiment shown, the boom 5 has a length of about 120 meters. The boom 5 comprises a longitudinal axis 11, a pivot end 12, a mid-section 13, and a hoisting end 14 opposite the pivot end 12 of the boom.

The boom 5 is supported by the crane structure 4, so that the boom can rotate about the vertical rotation axis 15. The pivot end 12 of the boom is pivotable connected to the crane structure 4, so that the boom 5 can pivot up and down about a horizontal boom pivot axis 16. As depicted, the boom of the exemplary embodiment shown in FIG. 1 can pivot about the horizontal boom pivot axis parallel to the plane of the Figure.

The boom luffing assembly 6 comprises a boom luffing wire 17 and a boom luffing winch, associated with the luffing wire 17. The boom luffing wire 17 extends from the boom luffing winch to the hoisting end 14 of the boom, for pivoting the boom 5 upward and downward about the boom pivot axis 16, and for supporting the boom 5 in a hoisting position relative to the crane structure 4.

The hoisting assembly, for hoisting a load, is not shown. Typically, the hoisting assembly comprises a hoisting winch, a hoisting wire, and a load suspension device, wherein the hoisting wire extends from the hoisting winch via a hoisting wire guide, located at the hoisting end of the of the boom 5, to the load suspension device.

According to the invention, the crane comprises the boom restrainer 8, for reducing, preferably blocking, upward pivoting of the boom 5, when the boom 5 is in a top zone.

In the top zone, the angle of the boom 5 with the vertical rotation axis 15 of the crane is 40 degrees or less, preferably is 50 degrees or less, most preferably is 60 degrees or less. Thus, in an embodiment, the top zone extends from a position wherein the boom makes an angle with the vertical rotation axis of the crane of 60 degrees, up to a position wherein the boom is fully raised. In the embodiment shown, the top zone starts at the position of the boom 5 with the vertical axis of rotation 15 of the crane 1 is 40 degrees. This is the position wherein the boom restrainer 8 engages the boom 5 of the crane 1.

The boom restrainer 8 comprises a first member 18 and a second member 19.

According to the invention, the first member 18 of the boom restrainer is configured for engaging, preferably being connected with, the crane structure or a mast of the crane, when the boom is in the top zone. Furthermore, the second member 19, is configured for engaging, preferably being connected with, the boom, when the boom is in the top zone.

In the embodiment shown, the boom restrainer is embodied as a telescopic arm 8. The first member is embodied as the piston body 18 and the second member is embodied as the piston rod 19. The second member 19 therefore is telescopically received in the first member 18.

Figure 4:
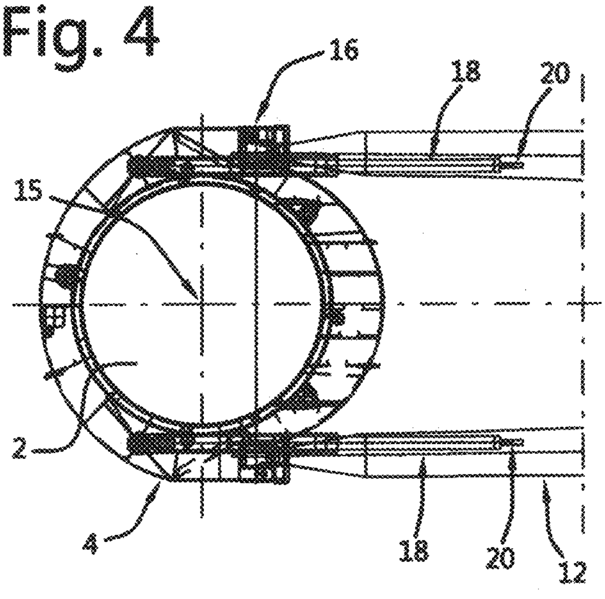
FIG. 4 shows the heavy lift crane of FIG. 1 in a partial close up in top view, wherein the crane is depicted with the boom in the lowered position, and in an intermediate position.

In the embodiment shown, the first member 18 is mounted on the mast 4 of the crane 1, with the second member 19 directed towards the boom 5 of the crane 1. Furthermore, in the embodiment shown, the boom restrainer 8 comprises a telescopic arm on both sides of the boom 5, which can be seen in the top view depicted in FIG. 4

Figure 3:
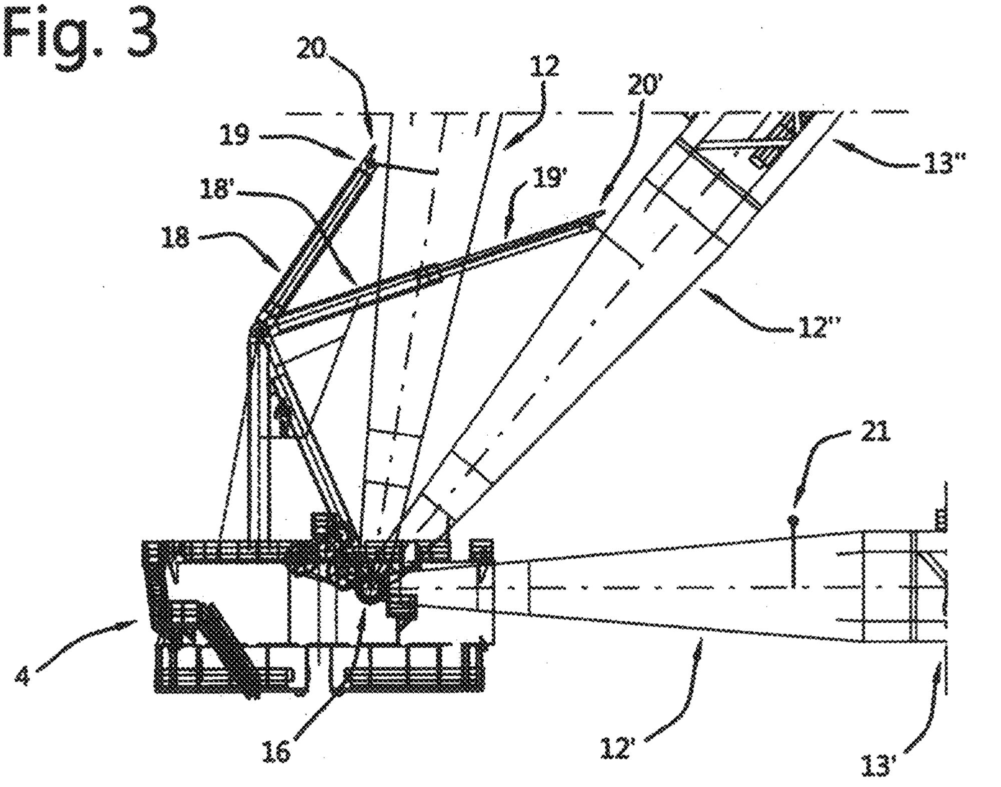
FIG. 3 shows the heavy lift crane of FIG. 1 in partial close up in side view, wherein the crane is depicted with the boom in the lowered position, and in an intermediate position.

The second member 19, of both telescopic arms, comprises a couple element 20, provided on the second member of the respective telescopic arm, for engaging the boom 5, when the boom is pivoted into the top zone. In the embodiment shown, the boom is provided with a catcher 21 embodied as a cylindrical body. The catch is configured to be coupled when the boom is raised into the top zone, and the telescopic arm is in an extended positon. This is depicted in intermediate position shown in FIG. 3.

When the boom is pivoted upwards in the top zone, the second member 19 is configured to telescopically slide into the first member 18. Furthermore, the couple element 20 remains engaged with the catcher 21. FIG. 1 depicts the boom 5 in a fully raised position, in which the second member 19 of the telescopic arm is fully retracted in the first member 18. In this embodiment, the boom, when in the fully raised positon, is positioned at the top end of the top zone.

It is furthermore noted that the telescopic arm 8, when not coupled with the boom 5, is supported in a position in which the couple element 20 will engage the catcher 21, when the boom 5 is pivoted into the top zone. This position of the telescopic arm 8 is for example depicted in FIG. 1, in combination with the boom being supported by the luffing assembly in a substantially horizontal position.

The control system 9 comprises one or more sensors to monitor loss of a load, e.g. sensors monitoring tension in the hoisting wire and/or in the luffing wire, and/or one or more sensors to monitor roll of the vessel. According to the invention, boom restrainer 8 can be switched between a passive modus and an active modus.

In the passive modus, the boom restrainer allows for movement of the second member 19 relative of the first member 18, and thus allows for movement of the boom 5 relative to the mast 2 of the crane 1. In this modus, the hydraulic cylinders of the telescopic arms allow for the boom to be pivoted upwards. In an embodiment, the hydraulic cylinders are pressurised, such that they are biased, but still allow for the boom to be pivoted upwards.

In the active modus, the boom restrainer slows down and preferably blocks movement of the second member 19 relative to the first member 18, and thus slows down and preferably blocks movement of the boom 5 relative to the mast 2 of the crane 1. In this modus, the hydraulic cylinders of the telescopic arms are hydraulically actuated, to dampen any upward movement of the boom, and preferably stop any upward movement of the boom.

In the embodiment shown, the boom restrainer comprises two telescopic arm, and each telescopic arm 8 comprises one hydraulic cylinder. The boom restrainer furthermore comprises a hydraulic system coupled with the two hydraulic cylinders. The hydraulic cylinders are configured to move the second member, i.e. the piston of the hydraulic cylinder, in a linear direction relative to the first member, i.e. the piston body.

The control system 9 is configured to switch the boom restrainer 8 from the passive modus into the active modus when the one or more sensors register a loss of load and/or roll of the vessel. More in particular, the control system is configured to use the hydraulic system to slow down movement of the boom and/or stop movement of the boom. Thus, the boom restrainer is configured for reducing, preferably blocking, upward pivoting of the boom relative to the crane, when the boom is in a top zone in case of a loss of load supported by the crane.

It is noted that, when the boom 5 pivots out of the top zone, the first member, more in particular the couple element 20, disengages from the catcher 21.

Figure 5:
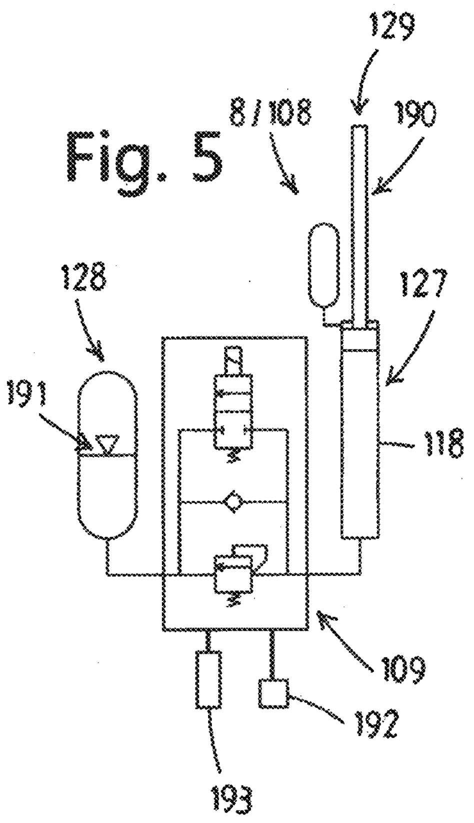
FIG. 5 shows a hydraulic schedule.

FIG. 5 shows a hydraulic schedule of the hydraulic cylinders of the boom restrainer 8. The boom restrainer 8 comprises a gas buffer 128 for each hydraulic cylinder 127. In the FIGS. 1-4, the gas buffer 128 is not depicted. Each gas buffer 128 is mounted to the corresponding cylinder 127 and is connected to the hydraulic circuit of the corresponding cylinder via a medium separator 191. The gas buffer 128 forces the hydraulic cylinder 127 in an extend position. The volume ratio between the hydraulic cylinder and the gas buffer preferably is such that the hydraulic cylinder acts as a progressive spring.

Figure 6:
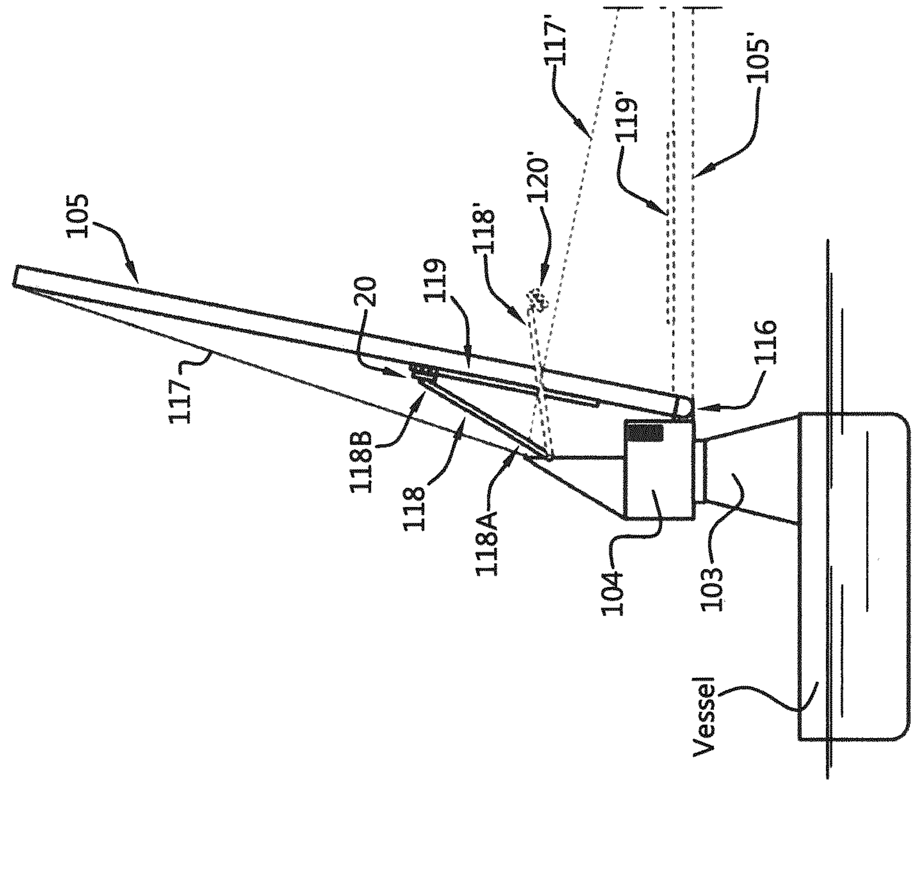
FIG. 6 shows a second exemplary embodiment of a heavy lift crane according to the invention in side view, wherein the crane is depicted with a boom in a lowered position and in a raised position.

FIG. 6 shows an alternative exemplary embodiment of a heavy lift crane 101 according to the invention in side view, wherein the crane 101 is depicted with a boom 105 in a lowered position and in a raised position.

The second member 119 of the boom restrainer 108 comprises a track 119. The track 119 is mounted on the boom 105 and extends along the longitudinal axis of the boom. The first member 118 is an arm that extends between a base end 118A and a boom end 118B. The base end 118A of the arm 118 is pivotable mounted on the crane structure 104, and the boom end 118B is configured to be slideable coupled with the track 119.

When the boom 104 is pivoted upward into the top range, the arm 118 slides with its boom end 118B upwards along the boom 105, more in particular, slides with its boom end 118B upwards along the boom 105.

When the boom 104 is in the top zone, and the boom restrainer 108 is in the passive modus, the boom restrainer allows for the boom end 118B of the arm 118 to slide along the track 119, and thus allows for movement of the boom 104 relative to the crane structure or the mast of the crane.

When the boom 104 is in the top zone, and the boom restrainer 108 is in the active modus, the boom restrainer is configured to slow down and preferably block movement of the boom end 118B along the track 119, to thus slow down and preferably block movement of the boom 104 in the upward direction relative to the crane structure or the mast of the crane.

In the embodiment shown, the track is provided with a coupling hook, for engaging the cart, and a brake winch. The hook couples with the cart when the cart engages the track. The hook is linked with the winch via a brake cable. Preferably, the winch is, similar to winches provided on towboats, provided with a slip device, allowing the cable drum of the winch to slip relative to the drive, to thus enable overload of the wire.

The winch is configured to keep the tension in the brake cable constant, and thus to allow the cart to move along the track, when the boom restrainer is in the passive modus.

When the boom restrainer is switched into the active modus, the winch exerts a pulling force on the hook, thus slowing down the cart, preferably stopping the cart, and thus slowing down upward movement of the boom.

In an alternative embodiment, the winch is provided on the crane structure, and the brake wire is connected to the arm of the boom restrainer. In this embodiment, the wire can be permanently coupled with the arm. When the boom retainer is switched into the active modus, the winch.

Also, in addition or as an alternative, other configurations may be used to slow down and/or stop the cart and pivoting of the arm. For example, the track can be provided with a brake cylinder, extending parallel to the track, that couples with the cart when the cart engages the track, and that, by extending and retracting allows for the cart to move along the track, and that is also used for slowing down and stopping movement of the cart along the track.

In the embodiment shown, the boom end 118 of the arm 118 is provided with a cart that engages the track 119 provided on the boom.

According to the invention, the arm 118 may also be a telescopic arm, comprising a hydraulic cylinder configured to at least partially dampen movements of the boom.

It is noted that, when the boom 105 pivots out of the top zone, the first member, more in particular the cart mounted at the end of the arm 188, disengages the track.

Figure 7:
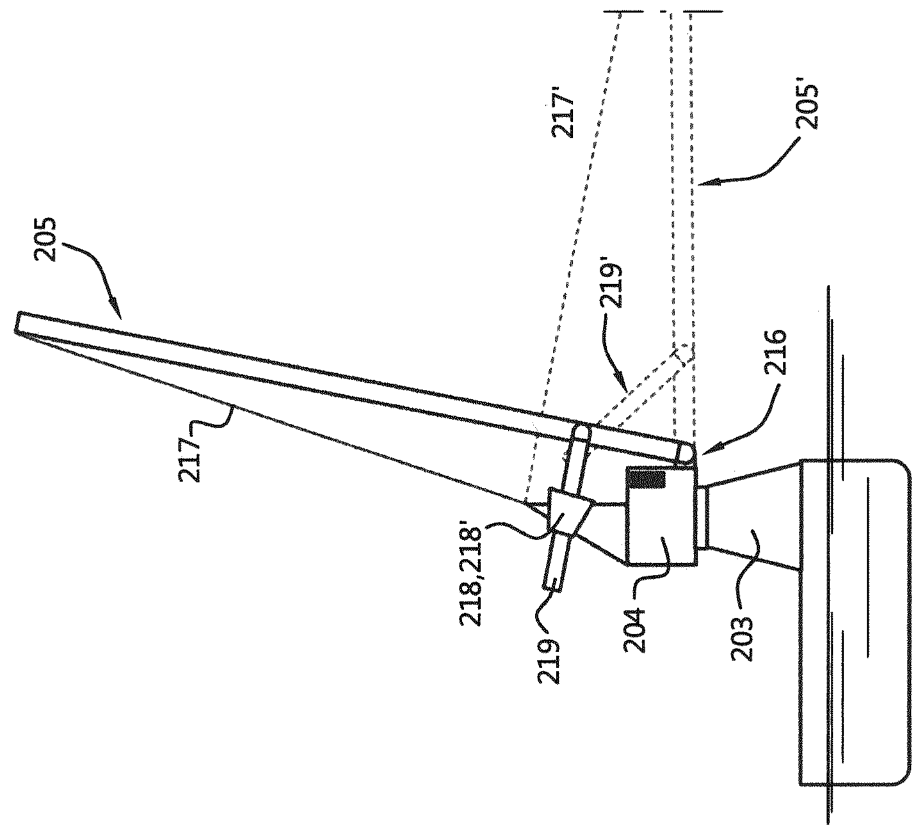
FIG. 7 shows a third exemplary embodiment of a heavy lift crane according to the invention in side view, wherein the crane is depicted with a boom in a lowered position and in a raised position.

FIG. 7 shows an alternative exemplary embodiment of a heavy lift crane 201 according to the invention in side view, wherein the crane 201 is depicted with a boom 205 in a lowered position and in a raised position.

In the embodiment shown in FIG. 7, the first member 218 of the boom restrainer 208 has an receiving end 218A and the second member 219 has a penetrating end 219A. The penetrating end 219A of the second member 219 is configured to be at least partially inserted into the receiving end 218A of the first member.

The first member 218 is mounted to the crane structure 204 with the receiving end 218A facing the boom 205, and the second member 219 is mounted on the boom 205 with the penetrating end 219A facing the crane structure 204. When the boom 205 is pivoted into the top zone, the penetrating end 219A of the second member 219 is inserted into the receiving end 218A of the first member 218, and the second member 219 slides into the first member 218 when the boom 205 is pivoted upwards in the top zone, The first member 218 is configured to, when the boom 205 is in the top zone and the boom restrainer 208 is in the passive modus, allow for movement of the second member 219 relative of the first member 2018, and to thus allow for movement of the boom 205 relative to the crane structure 204 or the mast 210 of the crane 201.

The first member 218 is furthermore configured to, when the boom 205 is in the top zone and the boom restrainer 208 is in the active modus, slow down and preferably block movement of the second member 219 relative to the first member 218, to thus slow down and preferably block tilting movement of the boom 205 in the upward direction relative to the crane structure 204 or the mast 210 of the crane 201.

In the preferred embodiment shown, the first member 218 is provided with fixating devices for engaging the second member 219. The fixating devices 218 can be activated by the control system 209 to reduce movement of the first member 218 relative to the second member 219, and preferably stop movement of the first member 218 relative to the second member 219, and huts of the boom 204 relative to the crane structure 204 or the mast 210 of the crane.

More in particular, in the embodiment shown, the first member 218 comprises fixating devices embodied as brake callipers, and the second member 219 comprises a brake plate 222 configured to slide between the brake callipers of the first member, when the boom is in the top zone. By activating the brake callipers, they engage the braking plate, which slows down movement of the second member relative to the first member, and may stop movement of the second member relative to the first member.

According to a third aspect, the invention provides for an offshore crane vessel, preferably comprising a heavy lift crane as shown in one or more of the FIGS. 1-7, wherein the vessel is configured for preventing excessive roll due to loss of load.

In an embodiment, the vessel is provided with additional floating bodies, set up opposite the lifting side of the vessel, to provide the hull with a more stable set up. The lifting side is the side where the crane is set up, and at which side the load will be lifted into of out of the water. For example, the crane may be mounted on the starboard side of the vessel, for lifting a pile, overboarding the pile, and lowering the pile towards the seafloor. In such an embodiment, the floating bodies are provided opposite the starboard side, at the port side of the vessel.

By providing the floating bodies, the hull of a vessel can temporarily be widened. Thus, in such an embodiment, the hull is effectively extended in a direction away from the side at which the crane is to lift a load. Thus, the hull is better able to resist a roll of the vessel, caused by the ballast tanks, in case of a sudden loss of the load lifted by the crane. For example, one or more pontoons can be connected to the hull of the vessel. Preferably, the pontoons are set up spaced form the hull, and are connected to the vessel via spacer arms, for example a truss construction extending between the vessel and the pontoons.

In an embodiment, the pontoons are also configured to provide a counterweight, in addition to the ballast tanks, to compensate for the load lifted by the crane.

Figure 8:
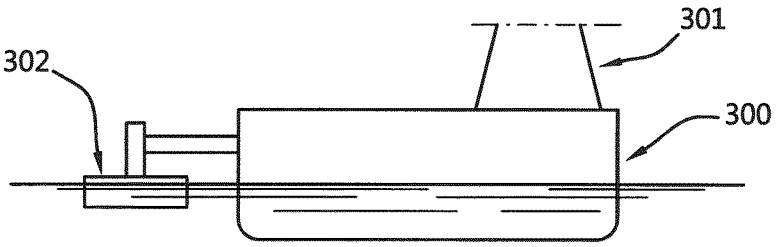
FIG. 8 shows a partial view in cross section of a vessel according to a third aspect of the invention, wherein the vessel is provided with a floating body on a side opposite a side where a crane is provided on the vessel.

FIG. 8 shows a partial view in cross section of a vessel 300 according to a third aspect of the invention, wherein the vessel 300 is provided with a floating body 302, e.g. a pontoon, on a side opposite a side where a crane 301 is provided on the vessel. It is noted that the crane 301 is only partially depicted.

In this embodiment, the floating body 302 is connected to the hull of the vessel via an arm. By providing an arm between the vessel and the floating body, in contrast with mounting the floating body directly to the hull of the vessel, the floating body is spaced from the vessel. This configuration increase the effect of the floating body, by increasing the moment force enacted by the floating body onto the vessel, in case of a loss of load. Due to the loss of load, the ballast tanks present in the vessel are no longer balanced by the load that was supported by the crane, and will make the vessel pivot about its longitudinal axis. This pivot movement is than counteracted by the upward force enacted by the floating bodies.

Figure 9:
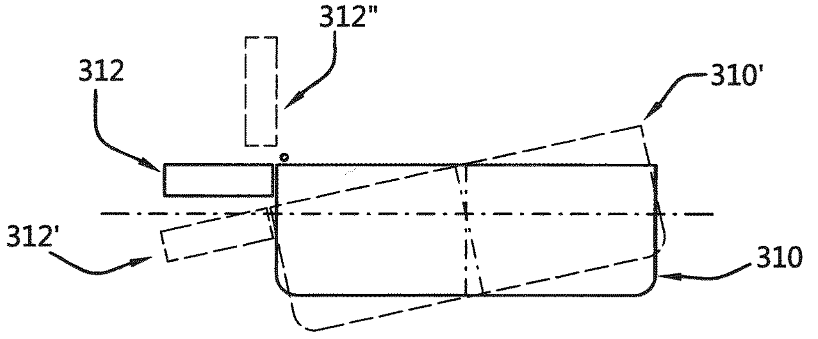
FIG. 9 shows a partial view in cross section of the vessel of FIG. 8 in a level and in a tilted position, wherein the vessel is provided with a raised floating body on a side opposite a side where a crane is provided on the vessel.

FIG. 9 shows a partial view in cross section of the vessel of FIG. 8 in a level and in a tilted position, wherein the vessel 310 is provided with a raised pontoon 312 on a side opposite a side where a crane (not shown) is provided on the vessel. In this embodiment, the floating body is pivotable attached to the hull, such that it can be pivoted in into an upright storage position, depicted with dotted lines, and a horizontal working position, in which it enacts an upward floating forces upon the hull of the vessel in case the vessel is pivoted due to the crane losing a load. In the figure, the vessel with the floating body is depicted in a level floating position, indicated with continuous lines, and is depicted in a tilted position in dotted lines. Furthermore, the floating body is also depicted in the upright storage positon in dotted lines.

In the particular embodiment shown, the floating body is attached to the hull such that it, in the horizontal working position, is located above the water. Thus, the floating body only enters the water when the ship is pivoted. Under normal conditions, the floating body is located outside the water and thus does not influence the dynamic characteristics of the hull of the vessel, for example does not cause drag when the vessel is moved from one location to the other.

The upright position of the floating body, which floating body is wider than it is high, reduces the overall width of the vessel, which is for example beneficial when maneuvering inside a port, or close to other vessels.

Figure 10:
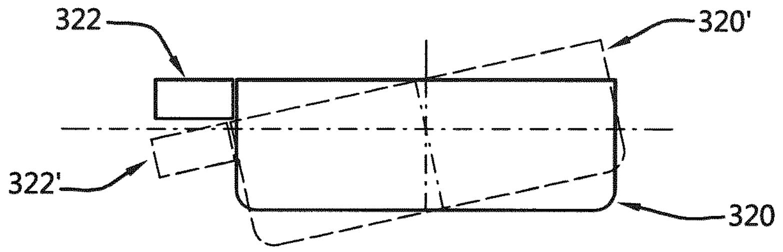
FIG. 10 shows a partial view in cross section of the vessel of FIG. 8 in a level and in a tilted position, wherein the vessel is provided with an alternative raised floating body on a side opposite a side where a crane (not shown) is provided on the vessel.

FIG. 10 shows a partial view in cross section of the vessel of FIG. 8 in a level and in a tilted position, wherein the vessel 320 is provided with an alternative raised floating body 322 on a side opposite a side where a crane (not shown) is provided on the vessel. The floating body shown in FIG. 10 is similar to the one shown in FIG. 9, except for the dimensions of the body. The floating body in FIG. 9 is a thinner, has a bit more height and is longer. Thus, the floating body can provides substantially the same upwards floating force as the floating body depicted in FIG. 9, albeit with different dimensions.

Figure 11:
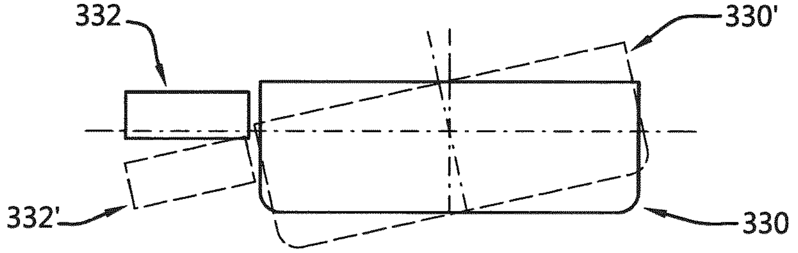
FIG. 11 shows a partial view in cross section of the vessel of FIG. 8 in a level and in a tilted position, wherein the vessel is provided with a partially raised floating body on a side opposite a side where a crane (not shown) is provided on the vessel.

FIG. 11 shows a partial view in cross section of the vessel of FIG. 8 in a level and in a tilted position, wherein the vessel 330 is provided with a partially raised floating body 332 on a side opposite a side where a crane (not shown) is provided on the vessel. Thus, the floating body is not emerged, and only partially penetrates the water. Therefore it only has a minimal effect on the dynamic properties of the vessel.

Figure 12:
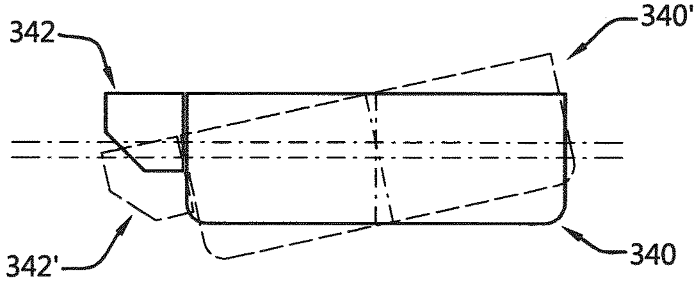
FIG. 12. shows a partial view in cross section of the vessel of FIG. 8 in a level and in a tilted position, wherein the vessel is provided with a partially raised floating body on a side opposite a side where a crane (not shown) is provided on the vessel.

FIG. 12. shows a partial view in cross section of the vessel of FIG. 8 in a level and in a tilted position, wherein the vessel 340 is provided with a partially raised floating body 342 on a side opposite a side where a crane (not shown) is provided on the vessel. The floating body is similar to the floating body depicted in FIG. 11. In this embodiment, the floating body has a bevelled shape, to provide the floating body with a more dynamic shape, that compliments the shape of the vessel. Thus the drag of the floating body, when the vessel is moved from one location to another, is reduced.

Figure 17:
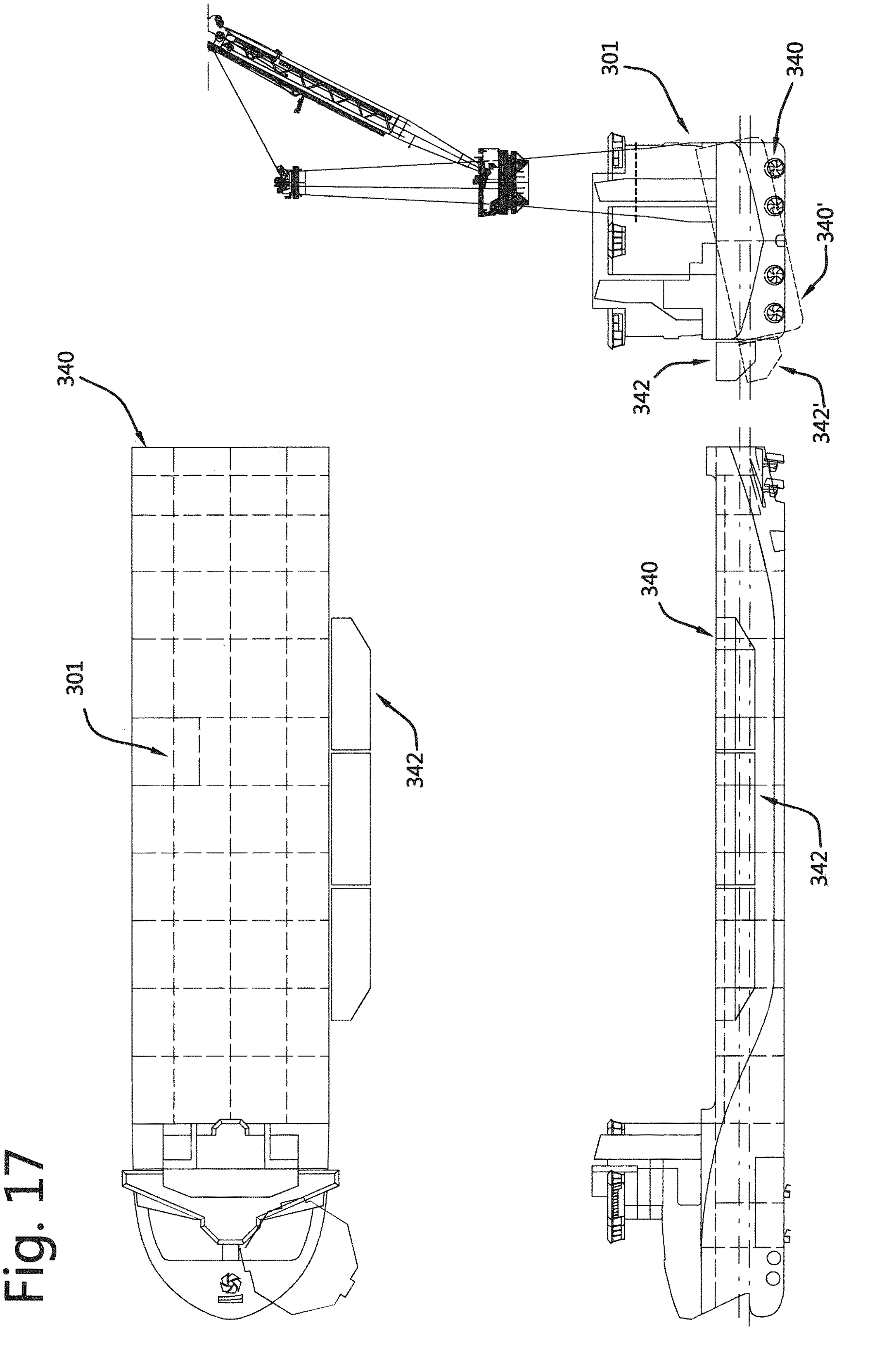
FIG. 17 show a top vie, a side view and a view in cross section of the vessel of FIG. 12, wherein the view in cross section shows the hull of the vessel also in a tilted position in dotted lines.

FIG. 17 show a top view, a side view and a view in cross section of the vessel of FIG. 12, wherein the view in cross section shows the hull of the vessel also in a tilted position in dotted lines.

Figure 13:
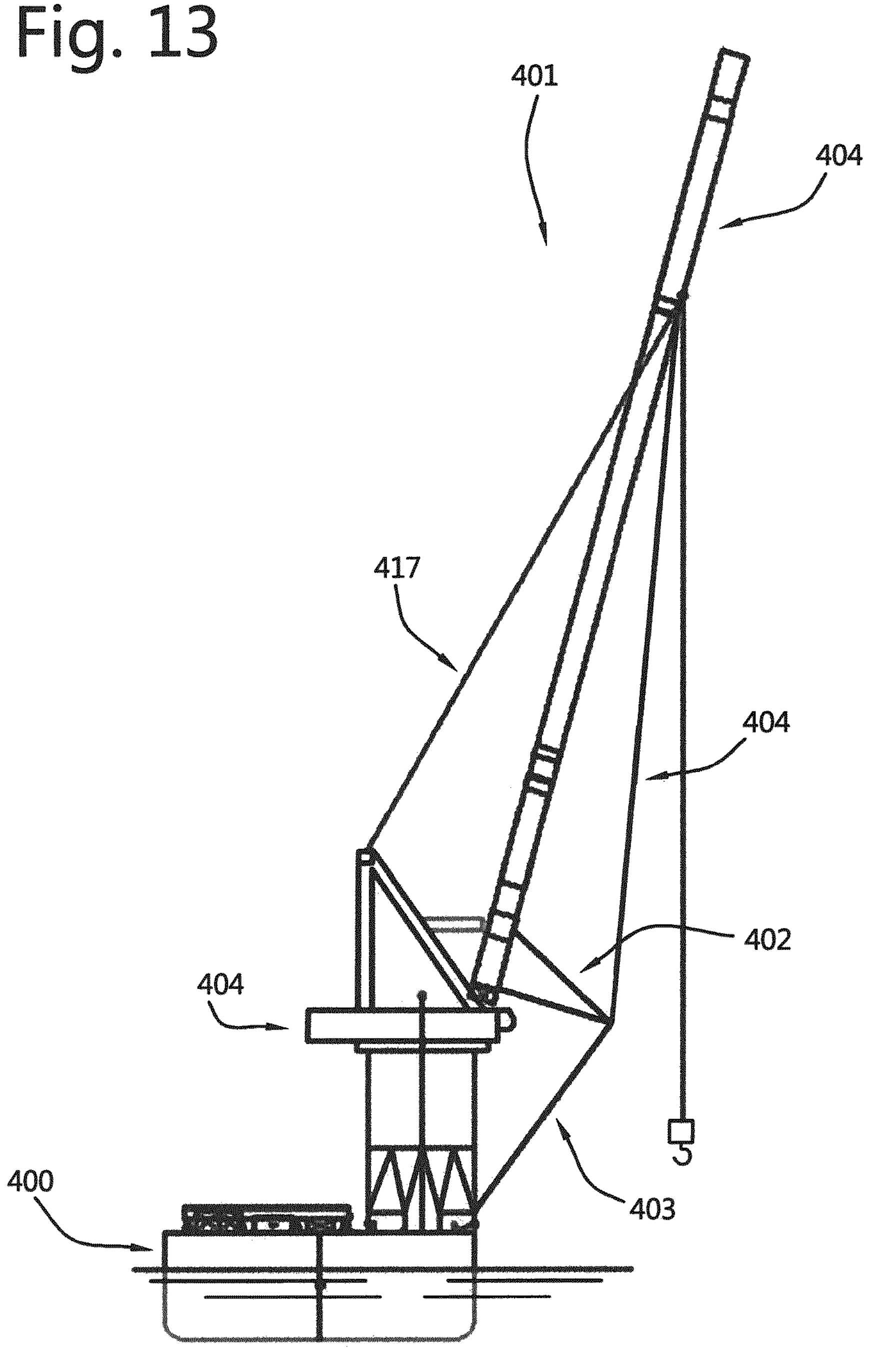
FIG. 13 shows an exemplary embodiment of a heavy lift crane according to a fourth aspect of the invention in side view, wherein the crane comprises a boom provided with a strut on a hoisting side of the boom.

FIG. 13 shows an exemplary embodiment of a heavy lift crane 401 according to a fourth aspect of the invention in side view, wherein the crane 401 comprises a boom 404 provided with a strut on a hoisting side of the boom.

The boom of the crane 401 is provided with a strut structure 402 at the lifting side of the crane, and with one or more retainer wires 403 connected to the strut structure, for exerting a pulling force on the boom. The retainer wires are connected to a pulling device, e.g. comprising one or more hydraulic cylinders and/or one or more winches, for enacting a pulling force on the retainer wires. The strut structure 402 sets the retainer wires 403 away from the boom, to thus enable a moment force to be enacted on the boom, pulling the boom downward.

In the preferred embodiment shown, support wires 404 extend from the strut structure 402 towards the top of the boom 404, the wires being fixed to the boom and the strut structure, to prevent excessive flexing of the boom when exerting a pulling moment on the boom using the retainer wires. This embodiment of the boom is in particular beneficial in case the crane structure is of limited height compared to the length of the boom.

With a vessel according to a further aspect of the invention, a roll damping mechanism is configured to quickly react in case of loss of load, and counteract roll motion of the vessel generated by the loss of load. A solid roll damping ballast is provided that is movable in the transverse direction of the hull, a sensor detecting a loss of load, and preferably a drive and a control system operable to cause and control the movements of the solid roll damping ballast in response to the detections of the sensor to provide roll stabilization.

During use, the solid mass of the roll damping mechanism is used to counter balance the load supported by the crane, optionally in combination with the use of ballast tanks comprising water and/or for example with the floating bodies discussed above. In case of a loss of load, the solid mass is transported quickly towards the opposite side of the vessel, to thus counteract the roll generated by the initial unbalance created by the loss of load.

Figure 14:
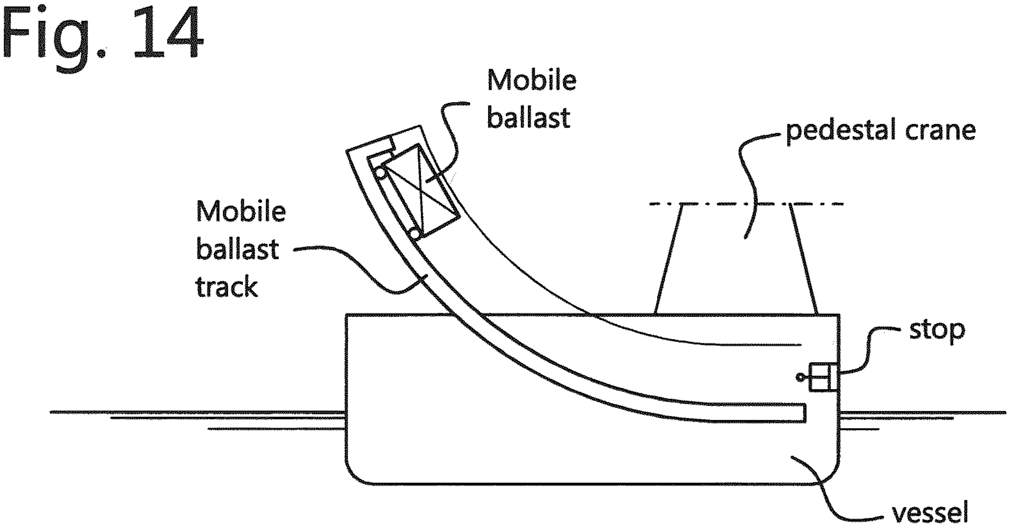
FIG. 14 shows an exemplary embodiment of a vessel in a partial view in cross section according to a fifth aspect of the invention, wherein the vessel is provided with a mobile ballast system.
Figure 15:
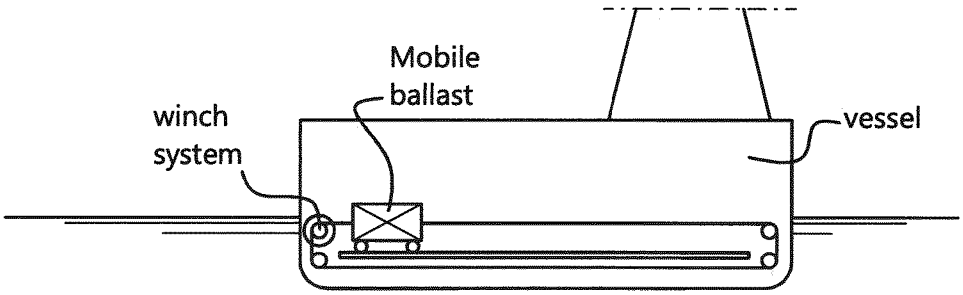
FIG. 15 shows another exemplary embodiment of a vessel in a partial view in cross section according to a fifth aspect of the invention, wherein the vessel is provided with a mobile ballast system.

FIG. 14 shows an exemplary embodiment of a vessel in a partial view in cross section according to a fifth aspect of the invention, wherein the vessel is provided with a mobile ballast system. In the embodiment shown, the mobile ballast is moved along a curved track. To balance the load of the crane, the ballast is moved to the left, and upward, along the track. In case of a loss of load by the crane, the ballast is released, and will move to the right under gravity. At the right end of the track, a stop is provided. The stop preferably is configured to somewhat gradually stop the mobile ballast FIG. 15 shows another exemplary embodiment of a vessel in a partial view in cross section according to a fifth aspect of the invention, wherein the vessel is provided with a mobile ballast system. In this embodiment, the mobile ballast is moved along the track using wires and winches.

Figure 16:
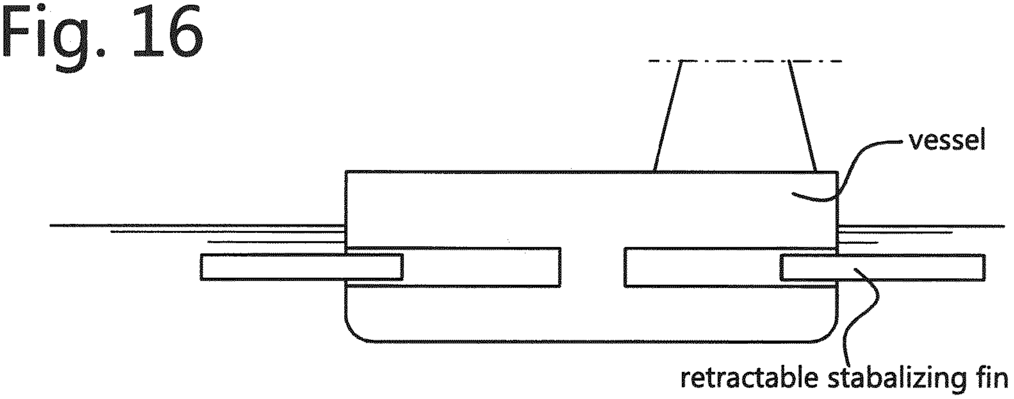
FIG. 16 shows another exemplary embodiment of a vessel in a partial view in cross section according to a sixth aspect of the invention, wherein the vessel is provided with retractable stabilising fins for use during hoisting activities.

FIG. 16 shows another exemplary embodiment of a vessel in a partial view in cross section according to a sixth aspect of the invention, wherein the vessel is provided with retractable stabilising fins for use during hoisting activities.

Figure 18:
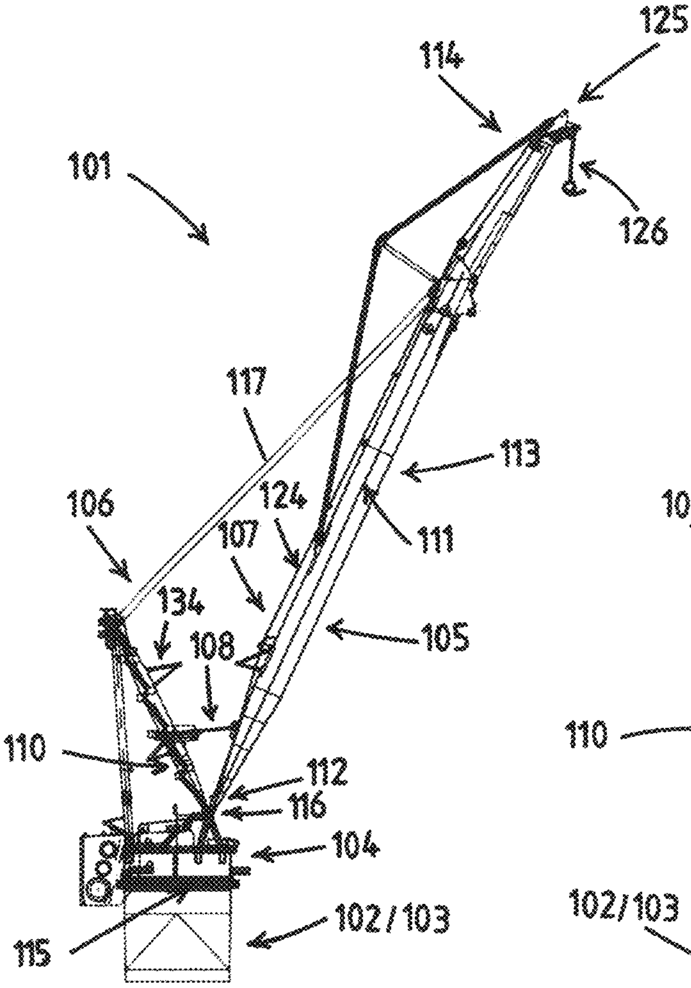
FIG. 18 shows an exemplary embodiment of a heavy lift crane according to a first aspect of the invention in side view, wherein the crane is depicted with a boom positioned at a lower end of a working zone.
Figure 19:
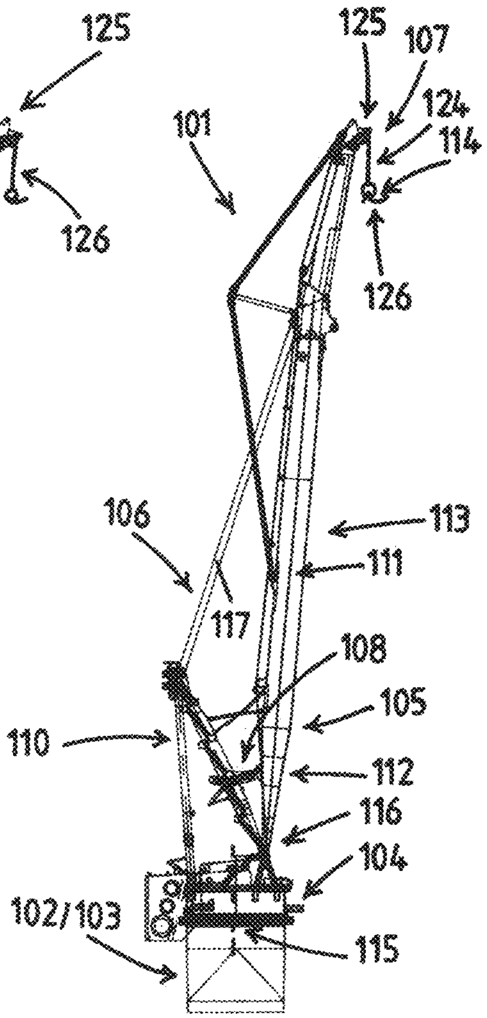
FIG. 19 shows the heavy lift crane of FIG. 18 with the boom positioned at an upper end of the working zone.

FIG. 18 and FIG. 19 show an exemplary embodiment of a heavy lift crane 101 according to a first aspect of the invention in side view, According to the invention, the heavy lift crane 101 comprises a base structure 103, a crane structure 104, a boom 105, a boom luffing assembly 106, a hoisting assembly 107, a boom restrainer 108 and a control system 109. In the embodiment shown, the crane is furthermore provided with a boom stop 123. The crane is mounted on a pedestal 102.

In the embodiment shown, the heavy lift crane 101 is a pedestal crane, and the base structure 103 is embodied as a pedestal 102 that is adapted to be mounted to a vessel.

The crane structure 104 comprises a crane housing. The crane structure 104 is rotationally supported via a slew bearing that is mounted on the pedestal 102 of the crane. Thus, the crane structure 104 can rotate relative to the base 103 about a vertical rotation axis 115.

In the embodiment shown, the boom 105 has a length of about 120 meters. The boom 105 comprises a longitudinal axis 111, a pivot end 112, a mid-section 113, and a hoisting end 114 opposite the pivot end 112 of the boom.

The boom 105 is supported by the crane structure 104, so that the boom can rotate about the vertical rotation axis 115. The pivot end 112 of the boom is pivotable connected to the crane structure 104, so that the boom 105 can pivot up and down about a horizontal boom pivot axis 116. As depicted, the boom of the exemplary embodiment shown in FIG. 18 and FIG. 19 can pivot about the horizontal boom pivot axis parallel to the plane of the Figure.

The hoisting assembly 107 comprises a hoisting winch, a hoisting wire 124, and a load suspension device 125. The hoisting wire extends from the hoisting winch, along the boom 105 via a hoisting wire guide 125, located at the hoisting end of the of the boom 105, to the load suspension device 126.

The boom luffing assembly 106 comprises a boom luffing wire 117 and a boom luffing winch, associated with the luffing wire 117. The boom luffing wire 117 extends from the boom luffing winch to the hoisting end 114 of the boom, for pivoting the boom 105 upward and downward about the boom pivot axis 116, and for supporting the boom 105 in a hoisting position relative to the crane structure 104.

With the luffing system, the boom 105 of the crane 101 can be pivoted in a working zone. The working zone comprises the range of boom positions, that allow for controlled lifting loads with the crane.

According to the invention, the crane 101 comprises the boom restrainer 108 for reducing upward pivoting of the boom 105. According to the first aspect of the invention, the boom restrainer 108 engages the boom 105 when the boom is pivoted into the top zone. Thus, when the boom 105 is in the top zone it is engaged by the boom restrainer 108, and when it is lowered out of the top zone, the boom restrainer disengages the boom.

The top zone overlaps with the working zone of the crane. In the embodiment shown, when the boom 105 is in the top zone, the angle of the boom 105 with the vertical rotation axis 115 of the crane is in the range of 5-25 degrees.

In FIG. 18 the crane 101 is depicted with a boom 105 positioned at a lower end of a working zone, and in FIG. 19 with the boom 105 positioned at an upper end of the working zone.

Figure 20:
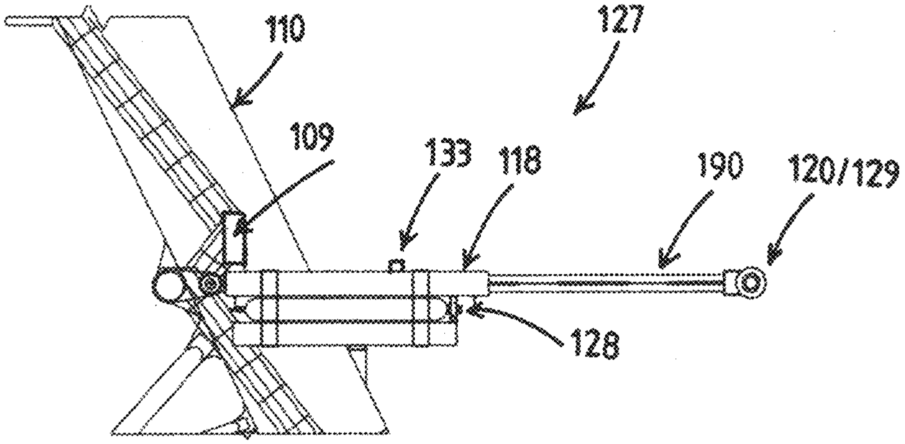
FIG. 20 shows in close up a hydro-pneumatic boom restrainer of the heavy lift crane of FIG. 18, with the hydro pneumatic boom restrainer not yet engaging the boom of the heavy lift crane.
Figure 21:
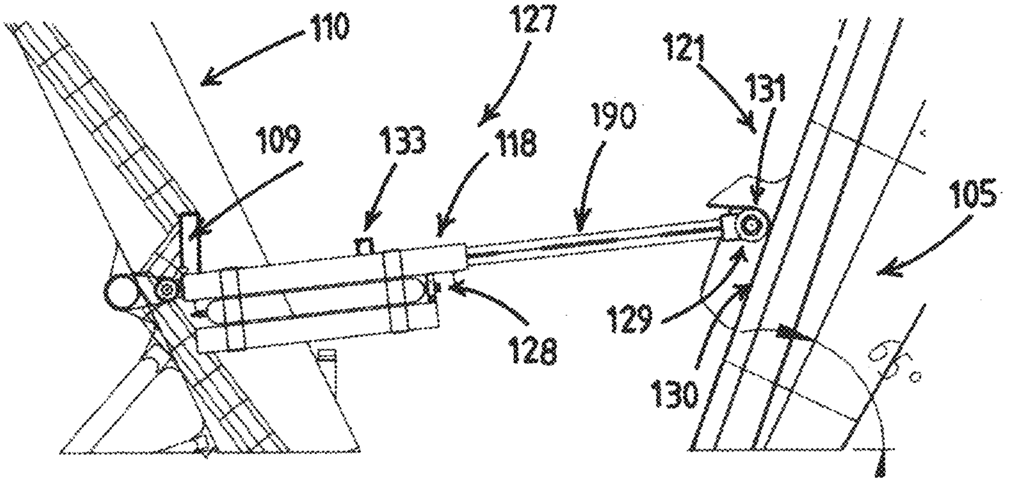
FIG. 21 shows in close up the hydro-pneumatic boom restrainer of the heavy lift crane of FIG. 18, with the boom at the lower end of the top zone and the hydro pneumatic boom restrainer engaging the boom of the heavy lift crane.
Figure 22:
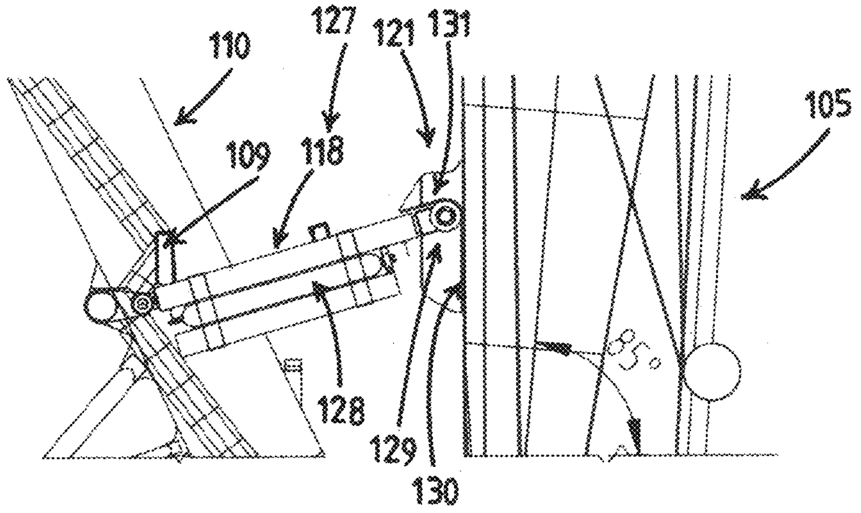
FIG. 22 shows in close up the hydro-pneumatic boom restrainer of the heavy lift crane of FIG. 18, with the boom at the upper end of the top zone and the hydro pneumatic boom restrainer engaging the boom of the heavy lift crane.

FIGS. 20-22 show in close up a hydro-pneumatic boom restrainer 108 of the heavy lift crane 101 in different working positions.

FIG. 20 shows in close up a hydro-pneumatic boom restrainer 108 of the heavy lift crane 101 with the hydro pneumatic boom restrainer 108 not yet engaging the boom 105 of the heavy lift crane 101.

FIG. 21 shows in close up the hydro-pneumatic boom restrainer 108 of the heavy lift crane 101 with the boom 105 at the lower end of the top zone and the hydro pneumatic boom restrainer 108 engaging the boom 105 of the heavy lift crane 101.

FIG. 22 shows in close up the hydro-pneumatic boom restrainer 108 of the heavy lift crane 101 with the boom 105 at the upper end of the top zone and the hydro pneumatic boom restrainer 108 engaging the boom of the heavy lift crane.

The boom restrainer shown in FIGS. 18-22 is similar to the boom restrainer shown in FIGS. 1-5.

In both embodiments, the boom restrainer comprises hydraulic cylinders having a first member and a second member. In the embodiments shown, the first member is embodied as a piston body or cylinder body and the second member is embodied as a piston rod or cylinder rod. The second member being telescopically received in the first member. The first member of the boom restrainer is connected with the crane structure of the crane, while the second member is configured for engaging the boom, when the boom is in the top zone.

In the embodiment shown in FIGS. 18-22 the first members, i.e. piston bodies or cylinder bodies 118, of the hydraulic cylinders 127, are mounted on a stay 110 of the crane 101, with the second members, i.e. piston rods or cylinder rods 190, more in particular the cylinder heads 129, directed towards the boom 105 of the crane 101. Furthermore, in both the embodiments shown, the boom restrainer 108 comprises telescopic arms, i.e. hydraulic cylinders 127, at both sides of the boom 105.

According to the invention, the boom restrainer 108 comprises a gas buffer 128 for each hydraulic cylinder 127. Each gas buffer 128 is mounted to the corresponding cylinder 127 and is connected to the hydraulic circuit of the corresponding cylinder via a medium separator 191. The gas buffer 128 forces the hydraulic cylinder 127 in an extend position. The volume ratio between the hydraulic cylinder 127 and the gas buffer 128 is such that the hydraulic cylinder acts as a progressive spring. In the embodiment shown, the gas buffers 128 each have a size of 1200 litre and the cylinders 127 each have a size of 900 litre. Preferably the ratio between the volume of the gas buffer and the volume of the associated hydraulic cylinder is 4:3.

The piston rods 190 of the hydraulic cylinders 127 comprises a couple element 120, in the embodiment shown embodied as the cylinder head, for engaging the boom 105, when the boom is pivoted into the top zone.

In the embodiment shown, the boom 105 is provided with a catcher 121 for each cylinder 127. Each catcher 121 is mounted on the boom 105 and is configured for receiving the cylinder head 120 of the corresponding cylinder 127, and to lock the cylinder head, in the embodiment shown pivotable locks the cylinder head, relative to the boom, when the boom pivots upwards in the top zone. This is depicted in intermediate position shown in FIG. 21.

The catcher 121 is configured to engage the couple element 120 when the boom 105 is raised into the top zone and the hydraulic cylinders 127 are in an extended position.

In the embodiment shown, the catcher 121 comprises a guide surface 130 and a blocking surface 131. The guide surface 130 engages the cylinder head 120 when the boom 105 pivots towards the top zone, and guides the cylinder head towards the blocking surface while the boom pivots into the top zone. The blocking surface 131 is provided at an end of the guide surface 130 to lock the cylinder head 120 relative to the boom 105. In FIG. 21 the cylinder head is pivotable locked relative to the boom by the catch, such that further moment of the boom 105 pushes the cylinder rod 190 into the cylinder body 118.

In the embodiment shown, the boom is to be raised over an angle of 2 degrees for the cylinder head 120 to move along the guide surface and get locked by the catcher 121.

It is furthermore noted that, in the embodiment shown, the hydraulic cylinders 127 are pivotable supported, such that they can pivot about a horizontal axis relative to the crane structure. When the boom restrainer engages the boom, and the boom pivots upwards, the cylinders pivot in an upward direction.

When the boom is pivoted upwards in the top zone, the cylinder rod 190 telescopically slides into the cylinder body 118 while the cylinder head 120 remains engaged with the catcher 121. FIG. 19 and FIG. 22 depict boom restrainer 108 when the boom 105 is in a fully raised position. The cylinder rod 190 of the hydraulic cylinder 127 is fully retracted in the cylinder body 118. In this embodiment, the boom, when in the fully raised position, is positioned at the top end of the top zone. It is noted that in the embodiment shown the boom, when in the fully raised position, is still at an angle with the vertical rotation axis of the crane.

Under normal working conditions, the boom restrainer 108 is in a passive modus. In this passive modus, the boom restrainer 108 allows for movement of the cylinder rods 119 relative of the cylinder bodies 118, and thus allows for movement of the boom 105 relative to the crane structure 104. In this modus, the hydraulic cylinders 127 allow for the boom to be pivoted upwards.

The hydraulic cylinders are pressurised, such that they are biased into the extended position. Furthermore, the gas buffer of the hydraulic cylinders is configured such that the cylinders act as a progressive spring. When the boom restrainer engages the boom in the passive modus, the hydraulic cylinders allow for the boom to be pivoted upwards but do provide a counter force that makes that the luffing wires are extra tensioned.

The control system 109 of the boom restrained 108 comprises sensors 192 to monitor loss of a load. In the embodiment shown, the sensors are configured to measure the movement of the cylinders rods in the cylinder bodies. When the boom suddenly pivots upwards, due to loss of load and/or roll of the vessel, the relative speed of the cylinder rods surpasses a predetermined threshold and the control system switches the boom retainer into the active modus. The control system 109 furthermore comprises sensors 193 for monitoring the angle of the boom, and/or that can detect if the boom is within the top zone or not.

In the active modus, the boom restrainer activates one or more valves in the hydraulic circuit of the hydraulic cylinders, to throttle the flow of hydraulic fluid towards the medium separator.

Thus, the movement of the cylinder rods is impeded, which slows down, and preferably eventually blocks, movement of the cylinder rods relative to the cylinder bodies, and thus slows down, and preferably eventually blocks, movement of the boom 105 relative to the crane structure 104. In the active modus, the hydraulic cylinders are thus hydraulically actuated to dampen any upward movement of the boom, and preferably stop any upward movement of the boom.

As explained, the control system 109 is configured to switch the boom restrainer 108 from the passive modus into the active modus when the one or more sensors register a loss of load and/or roll of the vessel. More in particular, the control system is configured to use the hydraulic circuit to slow down movement of the boom and/or stop movement of the boom. Thus, the boom restrainer 108 is configured for reducing, preferably blocking, upward pivoting of the boom relative to the crane, when the boom is in a top zone in case of a loss of load supported by the crane.

In the embodiment shown, the boom restrainer 108 comprises four hydraulic cylinders. The boom restrainer furthermore comprises a hydraulic circuit and a gas buffer coupled with each hydraulic cylinder.

It is noted that, when the boom 105 pivots out of the top zone, the couple element 120, disengages from the catcher 121.

In the embodiment shown, the crane 101 is furthermore provided with a boom stop 134. The boom stop 134 is configured to stop the boom 105 when it is positioned at the upper end of the working are. In this position, the boom is also at the upper end of the top zone, end is at an angle of 5 degrees with the vertical pivot axis of the crane.

The invention can be summarized according to one or more of the following clauses:

1. Heavy lift crane for use on a vessel, the crane comprising:

a base structure, wherein the base structure is adapted to be mounted to, or formed integral with, the vessel;

a crane structure, wherein the crane structure is rotationally supported by the base structure for rotation of the crane structure relative to the base about a vertical rotation axis;

a boom, preferably having a length of 80-200 meters, wherein the boom comprises a longitudinal axis, an pivot end, a mid-section, and a hoisting end opposite the pivot end, wherein the boom is supported by the crane structure, so that the boom can rotate about the vertical rotation axis, and wherein the pivot end of the boom is pivotably connected to the crane structure, so that the boom can pivot up and down about a horizontal boom pivot axis;

a boom luffing assembly, wherein the luffing assembly comprises a boom luffing wire and a boom luffing winch, wherein the boom luffing wire extends from the boom luffing winch to the hoisting end of the boom, for pivoting the boom upward and downward about the pivot axis, and for supporting the boom in a hoisting position relative to the crane structure;

a hoisting assembly for hoisting a load, wherein the hoisting assembly comprises a hoisting winch, a hoisting wire, and a load suspension device, wherein the hoisting wire extends from the hoisting winch via a hoisting wire guide, located at the hoisting end of the of the boom, to the load suspension device;

a boom restrainer, for reducing, preferably blocking, upward pivoting of the boom, when the boom is in a top zone, in which top zone the angle of the boom with the vertical rotation axis of the crane is 40 degrees or less, preferably is 50 degrees or less, most preferably is 60 degrees or less, wherein the boom restrainer comprises:

a first member for engaging, preferably being connected with, the crane structure or a mast of the crane, when the boom is in the top zone;

a second member, for engaging, preferably being connected with, the boom, when the boom is in the top zone;

a control system; comprising one or more sensors to monitor loss of a load, e.g. sensors monitoring tension in the hoisting wire and/or in the luffing wire, and/or one or more sensors to monitor roll of the vessel;

wherein the boom restrainer can be switched between a passive modus, in which it allows for movement of the second member relative of the first member, and thus allows for movement of the boom relative to the crane structure or the mast of the crane, and an active modus, in which it slows down and preferably blocks movement of the second member relative to the first member, and thus slows down and preferably blocks movement of the boom relative to the crane structure or the mast of the crane, and wherein the control system is configured to switch the boom restrainer from the passive modus into the active modus when the one or more sensors register a loss of load and/or roll of the vessel.

2. Heavy lift crane according to clause 1, wherein the boom of the crane can be pivoted in a working zone, in which working zone for example the angle of the boom with the vertical rotation axis of the crane is between 20 degrees and 100 degrees with the vertical rotation axis of the crane, and wherein the top zone overlaps with the working zone.

3. Heavy lift crane according to clause 1 or clause 2, wherein the crane furthermore is provided with a boom stop, wherein the boom stop is configured to block movement of the boom at a safety angle, the safety angle being the maximum height wherein the boom can be pivoted, for example is at the upper end of the working zone.

4. Heavy lift crane according to clause 3, wherein the boom stop comprises a crush zone, configured to slow down and preferably stop a boom by controlled deformation, for example when the boom moves beyond a maximum working angle, for example moves beyond the upper end of the working zone.

5. Heavy lift crane according to clause 3 or clause 4, wherein the boom stop comprises a bumper, e.g. hydraulic cylinders, that engage the boom prior to the boom reaching a maximum working angle, to resiliently receive the boom and prevent the boom from coming to a hard stop against the boom stop.

6. Heavy lift crane according to clause 5, wherein the boom stop comprises sensors, for example in the bumper, e.g. in the form of hydraulic cylinders, that are linked to the control system, and wherein the control system is configured to block the luffing system from further lifting the boom, thus preventing the luffing system from pivoting the boom beyond the maximum working angle.

7. Heavy lift crane according to one or more of the preceding clauses, wherein the crane structure is provided with one or more bumpers that are configured to engage the boom, preferably an impact zone on the boom, when the boom pivots beyond a maximum working angle.

8. Heavy lift crane according to one or more of the preceding clauses, wherein the boom is provided with one or more bumpers that are configured to engage the crane structure and/or the mast of the crane, preferably an impact zone on the crane structure or the mast of the crane, when the boom pivots beyond a maximum working angle 9. Heavy lift crane according to one or more of the preceding clauses, wherein the boom restrainer comprises a hydraulic cylinder, and wherein the boom restrainer is configured to keep the cylinder at a minimum pressure, at least when the boom is in contact with the boom restrainer, such that the restrainer keeps contact with the boom when the boom suddenly pivots in the downward direction, i.e. suddenly pivots away from the restrainer.

10. Heavy lift crane according to one or more of the preceding clauses, wherein the control system is configured to switch between slowing down of the boom and blocking the boom movement of the boom, for example by respectively partially and fully activating brake callipers or a hydraulic cylinder in a telescopic arm.

11. Heavy lift crane according to one or more of the preceding clauses, wherein the boom restrainer is comprises a crush zone, configured to slow down and stop a boom by controlled deformation, when the boom moves above a maximum pivot speed.

12. Heavy lift crane according to clause 11, wherein the maximum pivot speed is too high for the boom restrainer to slow down the boom prior to the boom receiving a maximum working angle, given the angle at which the boom restrainer is switched into the active modus.

13. Heavy lift crane according to one or more of the preceding clauses, wherein the boom restrainer can be disconnected from the crane and/or from the boom, or wherein the first member can be moved away from the second member, when the boom is lowered below the top zone.

14. Heavy lift crane according to one or more of the preceding clauses, wherein the control system is configured to, once switched into the active modus, slow down movement of the boom in the upward direction as well as in the downward direction.

15. Heavy lift crane according to one or more of the preceding clauses, wherein the boom restrainer comprises a telescopic arm, the telescopic arm comprising the first member and the second member, wherein the second member is telescopically received in the first member, and wherein the first member is mounted on the crane structure, or the mast of the crane, with the second member directed towards the boom of the crane; and wherein the second member comprises a couple element, provided on the second member of the telescopic arm, for engaging the boom, preferably for engaging a catch provided on the boom, when the boom is pivoted into the top zone, and wherein the second member is configured to telescopically slide into the first member when the boom is pivoted into the top zone, wherein the telescopic arm furthermore is configured to, when the boom is in the top zone and the boom restrainer is in the passive modus, allow for movement of the second member relative of the first member, and to thus allow for movement of the boom relative to the crane structure or the mast of the crane, and when the boom is in the top zone and the boom restrainer is in the active modus, slow down and preferably block movement of the second member relative to the first member, e.g using brake pads or hydraulic fluid, to thus slow down and preferably block tilting movement of the boom in the upward direction relative to the crane structure or the mast of the crane.

16. Heavy lift crane according to clause 15, wherein the arm comprises at least one hydraulic cylinder and an hydraulic system coupled with the at least one hydraulic cylinder, wherein the at least one hydraulic cylinder is configured to move the second member in a linear direction relative to the first member, and wherein the control system is configured to use the hydraulic system to slow down movement of the boom and/or stop movement of the boom.

17. Heavy lift crane according to one or more of the clauses 1-14, wherein the first member has an receiving end and the second member has a penetrating end, and wherein the penetrating end of the second member is configured to be at least partially inserted into the receiving end of the first member, wherein the first member is mounted to the crane structure with the receiving end facing the boom, and the second member is mounted on the boom with the penetrating end facing the crane structure, and wherein, when the boom is pivoted into the top zone, the penetrating end of the second member is inserted into the receiving end of the first member, and the second member slides into the first member when the boom is pivoted upwards in the top zone, wherein the first member is configured to, when the boom is in the top zone and the boom restrainer is in the passive modus, allow for movement of the second member relative of the first member, and to thus allow for movement of the boom relative to the crane structure or the mast of the crane, and when the boom is in the top zone and the boom restrainer is in the active modus, slow down and preferably block movement of the second member relative to the first member, e.g using brake pads, to thus slow down and preferably block tilting movement of the boom in the upward direction relative to the crane structure or the mast of the crane.

18. Heavy lift crane according to clause 17, wherein the first member and/or the second member are/is provided with fixating devices for engaging the second member or the first member respectively, wherein the fixating devices can be activated by the control system to reduce movement of the first member relative to the second member, and preferably stop movement of the first member relative to the second member.

19. Heavy lift crane according to clause 17 or clause 18, wherein the first member and/or the second member comprises fixating devices embodied as brake callipers, and wherein respectively the second member and/or the first member comprise a brake plate configured to slide between the brake callipers of the first member and/or the second member, when the boom is in the top zone.

20. Heavy lift crane according one or more of the clauses 1-14, wherein the second member comprises a track, wherein the track is mounted on the boom and extends along the longitudinal axis of the boom, and wherein the first member is an arm that extends between a base end and a boom end, wherein the base end of the arm is pivotably mounted on the crane structure, or to the mast of the crane, and the boom end is configured to be slideable coupled with the track, and wherein, when the boom is pivoted upward in the top range, the arm slides with its boom end upwards along the boom, wherein the first member is configured to, when the boom is in the top zone and the boom restrainer is in the passive modus, allow for the boom end of the arm to slide along the track, and to thus allow for movement of the boom relative to the crane structure or the mast of the crane, and when the boom is in the top zone and the boom restrainer is in the active modus, slow down and preferably block movement of the boom end of along the track, e.g. using brake pads or a cylinder, to thus slow down and preferably block tilting movement of the boom in the upward direction relative to the crane structure or the mast of the crane.

21. Heavy lift crane according to clause 20, wherein the boom end is configured to engage the track, or a slide mounted on the track, when the boom pivots into the top zone, and to disengage the track, or slide, when the boom is pivoted in a downward direction out of the top zone.

22. Heavy lift crane according to clause 20 or clause 21, wherein the first member is configured to engage a slide, e.g. a cart, on the track or to slidable engage the track, 23. Heavy lift crane according to one or more of the preceding clauses, wherein the boom restrainer is at one end connected to the crane structure or the mast of the crane can be disconnected from the crane and/or from the boom, to enable a large angle between the boom and the crane structure 24. Heavy lift crane according to clause 23, wherein the boom restrainer is configured to engage the boom and the crane structure when the angle of the boom with the vertical rotation axis of the crane is 40 degrees or less, preferably is 50 degrees or less, most preferably is 60 degrees or less.

25. Heavy lift crane according to one or more of the preceding clauses, wherein the boom restrainer comprises an interface that enables an operator switch the boom restrainer between the passive modus and the active modus.

26. Heavy lift crane according to one or more of the preceding clauses, wherein the control system comprises sensors for monitoring the angle of the boom, and/or that can detect of the boom is within the top zone or not.

27. Heavy lift crane according to one or more of the preceding clauses, wherein the crane is a mast crane.

28. Heavy lift crane according to one or more of the clauses 1-26, wherein the crane is a pedestal crane, the crane structure comprising a stay for supporting the luffing wires, and wherein the boom restrainer is preferably mounted to the stay.

29. Offshore crane vessel provided with a heavy lift crane according to one or more of the preceding clauses.

30. Method for stopping the upwards pivot movement of a boom, the boom moving in the top zone, using a heavy lift crane according to one or more of the clauses 1-26, or a vessel according to clause 29, wherein the method comprises the steps:

Lifting a load and raising the boom into the top zone;

Detecting a loss of load;

Switching the boom restrainer from the passive modus into the active modus;

Engaging the second member with the first member;

Slowing down movement of the second member, and thus the boom, relative to the first member, and thus relative to the crane structure or the mast of the crane;

Stopping movement of the second member, and thus the boom, relative to the first member, and thus relative to the crane structure or the mast of the crane.

Reference signs

01 heavy lift crane
02 mast
03 base structure
04 crane structure
05 boom
06 boom luffing assembly
07 hoisting assembly
08 boom restrainer
09 control system
10 mast of the mast crane
11 longitudinal axis boom
12 pivot end boom
13 mid-section boom
14 hoisting end boom
15 vertical rotation axis of the crane
16 boom pivot axis
17 boom luffing wire
18 first member boom restrainer
118A base end arm
118B boom end arm
19 second member boom restrainer
20 couple element
21 catcher
22 brake plate
23 boom stop
101 heavy lift crane
102 pedestal
103 base structure
104 crane structure
105 boom
106 boom luffing assembly
107 hoisting assembly
108 boom restrainer
109 control system
110 stay
111 longitudinal axis of the boom
112 pivot end boom
113 mid-section of the boom
114 hoisting end boom
115 vertical rotation axis of the crane
116 boom pivot axis
117 boom luffing wire
118 piston body hydraulic cylinder
119 track
120 couple element/cylinder head
121 catcher
123 boom stop
124 hoisting wire
125 wire guide hoisting device
126 load suspension device
127 hydraulic cylinders
128 gas buffer
129 cylinder head
130 guide surface catcher
131 blocking surface catcher
133 sensor control system
190 piston rods of the hydraulic cylinder
192 one or more sensors to monitor loss off load
193 sensors for monitoring the angle of the boom and/or that can detect if the boom is within the top zone or not
300 vessel
301 crane
302 floating body

The invention claimed is:

1. A heavy lift crane for use on a vessel, the crane comprising:

a base structure, wherein the base structure is adapted to be mounted to, or formed integral with, the vessel;

a crane structure, wherein the crane structure is rotationally supported by the base structure for rotation of the crane structure relative to the base structure about a vertical rotation axis;

a boom, wherein the boom comprises a longitudinal axis, a pivot end, a mid-section, and a hoisting end opposite the pivot end, wherein the boom is supported by the crane structure, so that the boom can rotate about the vertical rotation axis, and wherein the pivot end of the boom is pivotably connected to the crane structure, so that the boom can pivot up and down about a horizontal boom pivot axis;

a boom luffing assembly, wherein the boom luffing assembly comprises a boom luffing wire and a boom luffing winch, wherein the boom luffing wire extends from the boom luffing winch to the hoisting end of the boom, for pivoting the boom upward and downward about the boom pivot axis, and for supporting the boom in a hoisting position relative to the crane structure, wherein the boom luffing assembly is configured to pivot the boom in a working zone that comprises the range of boom positions that allow for controlled lifting of a load with the crane, and that is at a top end thereof limited by a maximum operating boom angle, and wherein the boom luffing assembly is configured to pivot the boom into a top zone, wherein the top zone at least covers an angle of 16 degrees with the vertical rotation axis of the crane, and wherein the top zone overlaps with the working zone of the crane;

a hoisting assembly for hoisting a load, wherein the hoisting assembly comprises a hoisting winch, a hoisting wire, and a load suspension device, wherein the hoisting wire extends from the hoisting winch via a hoisting wire guide, located at the hoisting end of the boom, to the load suspension device; and a hydro-pneumatic boom restrainer, that is constructed and positioned on the crane to engage the crane boom when the boom is pivoted into the top zone for reducing upward pivoting of the boom, when the boom is in the top zone, wherein the boom restrainer comprises:

multiple hydraulic cylinders, each having a hydraulic circuit, comprising one or more valves that can be switched between a free flow configuration and a throttle configuration, and a cylinder rod with a cylinder head, wherein the hydraulic cylinders are mounted on the crane structure with the cylinder heads directed towards the boom of the crane;

a catcher for each hydraulic cylinder, wherein each catcher is mounted on the boom and is configured for receiving the cylinder head of the corresponding hydraulic cylinder, and to lock the cylinder head relative to the boom, when the boom pivots upwards into the top zone and the catcher engages the cylinder head, while the boom is still in the top zone;

a gas buffer for each hydraulic cylinder, wherein each gas buffer is mounted to the corresponding hydraulic cylinder, and is connected to the hydraulic circuit of the corresponding hydraulic cylinder via a medium separator, wherein the gas buffer forces the hydraulic cylinder in an extended position, and wherein the volume ratio between the hydraulic cylinder and the gas buffer is such that the hydraulic cylinder acts as a progressive spring; and a control system; comprising one or more sensors to monitor loss of a load, wherein the one or more sensors are mounted on the boom restrainer and/or on the crane and are linked to the control system, wherein the boom restrainer can be switched between:

a passive modus, in which the boom restrainer allows for movement of the cylinder rods in the respective hydraulic cylinders, and thus allows for movement of the boom relative to the crane structure or a mast of the crane in the top zone, and an active modus, in which the boom restrainer slows down and blocks movement of the cylinder rods in the respective hydraulic cylinders, and thus slows down and blocks movement of the boom relative to the crane structure or the mast of the crane in the top zone, and wherein the control system is configured to operate one or more valves in the hydraulic circuit of the respective hydraulic cylinders and to switch these one or more valves from the free flow configuration into the throttle configuration when the one or more sensors signal the control system a loss of the load and/or roll of the vessel, and to thus switch the boom restrainer from the passive modus into the active modus when the one or more sensors register a loss of load of the vessel.

2. The heavy lift crane according to claim 1, wherein in the top zone the angle of the boom with the vertical rotation axis of the crane is in the range of 0-30 degrees, and wherein the boom of the crane can be pivoted in the working zone, wherein in the working zone the angle of the boom with the vertical rotation axis of the crane is between 20 degrees and 100 degrees, and wherein the top zone overlaps with the working zone.

3. The heavy lift crane according to claim 1, further comprising a boom stop, wherein the boom stop is configured to block movement of the boom at a safety angle, the safety angle being the maximum height wherein the boom can be pivoted, and wherein the boom stop comprises a crush zone, configured to slow down and stop the boom by controlled deformation.

4. The heavy lift crane according to claim 3, wherein the boom stop comprises a bumper that engages the boom prior to the boom reaching a maximum working angle, to resiliently receive the boom and prevent the boom from coming to a hard stop against the boom stop.

5. The heavy lift crane according to claim 4, wherein the boom stop comprises sensors that are linked to the control system, and wherein the control system is configured to block the luffing system from further lifting the boom, thus preventing the luffing system from pivoting the boom beyond the maximum working angle.

6. The heavy lift crane according to claim 1, wherein the boom restrainer comprises a crush zone, configured to slow down and stop the boom by controlled deformation, when the boom moves above a maximum pivot speed.

7. The heavy lift crane according to claim 1, wherein the hydraulic circuits of the multiple hydraulic cylinders are coupled, to equalize load differences between the hydraulic cylinders.

8. The heavy lift crane according to claim 1, wherein the hydraulic cylinders are compressed when the boom is pivoted upwards in the top zone, and the hydraulic cylinders tension the luffing wires.

9. The heavy lift crane according to claim 1, wherein the cylinder rods of the boom restrainer are fully extended when they engage the boom and the boom is at an angle of 35 degrees with the vertical rotation axis.

10. The heavy lift crane according to claim 1, wherein the cylinder rods of the boom restrainer are fully retracted when the boom is at an angle of 15 degrees with the vertical rotation axis.

11. The heavy lift crane according to claim 1, wherein the boom is an A-frame boom.

12. The heavy lift crane according to claim 1, wherein the boom at a base end comprises a box frame, and the catchers for the hydraulic cylinders are mounted on the box frame.

13. The heavy lift crane according to claim 1, wherein the hydraulic cylinders are pivotable supported, such that the hydraulic cylinders can pivot about a horizontal axis relative to the crane structure.

14. The heavy lift crane according to claim 1, wherein the crane structure comprises a stay, and the stay is an A-frame, and two hydraulic cylinders are mounted on each leg of the A-frame.

15. The heavy lift crane according to claim 1, wherein the catchers comprise a guide surface and a blocking surface, and wherein the guide surface engages the cylinder head when the boom pivots towards the top zone, and guides the cylinder head towards the blocking surface while the boom pivots further towards the top zone, and wherein the blocking surface is provided at an end of the guide surface to lock the cylinder head relative to the boom, such that further moment of the boom pushes the cylinder rod into the hydraulic cylinder.

16. The heavy lift crane according to claim 1, wherein the control system comprises sensors for monitoring the angle of the boom, and/or that can detect if the boom is within the top zone or not.

17. An offshore crane vessel comprising the heavy lift crane according to claim 1.

18. A hydro-pneumatic boom restrainer configured to be mounted on a heavy lift crane to provide the heavy lift crane according to claim 1.

19. A method for stopping the upwards pivot movement of the boom, the boom moving in the top zone, using the heavy lift crane according to claim 1, wherein the method comprises the steps:

raising the boom into the top zone and engaging the boom with the boom restrainer;

lifting a load with the crane;

detecting a loss of load;

switching the boom restrainer from the passive modus into the active modus;

slowing down movement of the cylinder rods in the respective hydraulic cylinders, and thus slowing down movement of the boom relative to the crane structure or the mast of the crane; and stopping movement of the cylinder rods in the respective hydraulic cylinders, and thus stopping movement of the boom, relative to the crane structure or the mast of the crane.

20. A heavy lift crane for use on a vessel, the crane comprising:

a base structure, wherein the base structure is adapted to be mounted to, or formed integral with, the vessel;

a crane structure, wherein the crane structure is rotationally supported by the base structure for rotation of the crane structure relative to the base structure about a vertical rotation axis;

a boom, wherein the boom comprises a longitudinal axis, a pivot end, a mid-section, and a hoisting end opposite the pivot end, wherein the boom is supported by the crane structure, so that the boom can rotate about the vertical rotation axis, and wherein the pivot end of the boom is pivotably connected to the crane structure, so that the boom can pivot up and down about a horizontal boom pivot axis;

a boom luffing assembly, wherein the boom luffing assembly comprises a boom luffing wire and a boom luffing winch, wherein the boom luffing wire extends from the boom luffing winch to the hoisting end of the boom, for pivoting the boom upward and downward about the boom pivot axis, and for supporting the boom in a hoisting position relative to the crane structure, wherein the boom luffing assembly can pivot the boom into a top zone;

a hoisting assembly for hoisting a load, wherein the hoisting assembly comprises a hoisting winch, a hoisting wire, and a load suspension device, wherein the hoisting wire extends from the hoisting winch via a hoisting wire guide, located at the hoisting end of the of the boom, to the load suspension device; and a hydro-pneumatic boom restrainer, for reducing upward pivoting of the boom, when the boom is in the top zone, wherein the boom restrainer comprises:

multiple hydraulic cylinders, each having a hydraulic circuit and a cylinder rod with a cylinder head, wherein the hydraulic cylinders are mounted on the crane structure with the cylinder heads directed towards the boom of the crane;

a catcher for each hydraulic cylinder, wherein each catcher is mounted on the boom and is configured for receiving the cylinder head of the corresponding hydraulic cylinder, and to lock the cylinder head relative to the boom, when the boom pivots upwards in the top zone;

a gas buffer for each hydraulic cylinder, wherein each gas buffer is mounted to the corresponding hydraulic cylinder, and is connected to the hydraulic circuit of the corresponding hydraulic cylinder via a medium separator, wherein the gas buffer forces the hydraulic cylinder in an extended position, and wherein the volume ratio between the hydraulic cylinder and the gas buffer is such that the hydraulic cylinder acts as a progressive spring; and a control system; comprising one or more sensors to monitor loss of a load, wherein the boom restrainer can be switched between:

a passive modus, in which the boom restrainer allows for movement of the cylinder rods in the respective hydraulic cylinders, and thus allows for movement of the boom relative to the crane structure or a mast of the crane in the top zone, and an active modus, in which the boom restrainer slows down and blocks movement of the cylinder rods in the respective hydraulic cylinders, and thus slows down and blocks movement of the boom relative to the crane structure or the mast of the crane in the top zone, wherein the control system is configured to switch the boom restrainer from the passive modus into the active modus when the one or more sensors register a loss of load and/or roll of the vessel, and wherein the boom restrainer is configured to keep the hydraulic cylinder at a minimum pressure, at least when the boom is in contact with the boom restrainer, such that the restrainer keeps contact with the boom when the boom suddenly pivots in the downward direction.

21. A heavy lift crane for use on a vessel, the crane comprising:

a base structure, wherein the base structure is adapted to be mounted to, or formed integral with, the vessel;

a crane structure, wherein the crane structure is rotationally supported by the base structure for rotation of the crane structure relative to the base structure about a vertical rotation axis;

a boom, wherein the boom comprises a longitudinal axis, a pivot end, a mid-section, and a hoisting end opposite the pivot end, wherein the boom is supported by the crane structure, so that the boom can rotate about the vertical rotation axis, and wherein the pivot end of the boom is pivotably connected to the crane structure, so that the boom can pivot up and down about a horizontal boom pivot axis;

a boom luffing assembly, wherein the boom luffing assembly comprises a boom luffing wire and a boom luffing winch, wherein the boom luffing wire extends from the boom luffing winch to the hoisting end of the boom, for pivoting the boom upward and downward about the boom pivot axis, and for supporting the boom in a hoisting position relative to the crane structure, wherein the boom luffing assembly can pivot the boom into a top zone;

a hoisting assembly for hoisting a load, wherein the hoisting assembly comprises a hoisting winch, a hoisting wire, and a load suspension device, wherein the hoisting wire extends from the hoisting winch via a hoisting wire guide, located at the hoisting end of the of the boom, to the load suspension device; and a hydro-pneumatic boom restrainer, for reducing upward pivoting of the boom, when the boom is in the top zone, wherein the boom restrainer comprises:

multiple hydraulic cylinders, each having a hydraulic circuit and a cylinder rod with a cylinder head, wherein the hydraulic cylinders are mounted on the crane structure with the cylinder heads directed towards the boom of the crane;

a catcher for each hydraulic cylinder, wherein each catcher is mounted on the boom and is configured for receiving the cylinder head of the corresponding hydraulic cylinder, and to lock the cylinder head relative to the boom, when the boom pivots upwards in the top zone;

a gas buffer for each hydraulic cylinder, wherein each gas buffer is mounted to the corresponding hydraulic cylinder, and is connected to the hydraulic circuit of the corresponding hydraulic cylinder via a medium separator, wherein the gas buffer forces the hydraulic cylinder in an extended position, and wherein the volume ratio between the hydraulic cylinder and the gas buffer is such that the hydraulic cylinder acts as a progressive spring; and a control system; comprising one or more sensors to monitor loss of a load, wherein the boom restrainer can be switched between a passive modus, in which the boom restrainer allows for movement of the cylinder rods in the respective hydraulic cylinders, and thus allows for movement of the boom relative to the crane structure or the mast of the crane in the top zone, and an active modus, in which the boom restrainer slows down and blocks movement of the cylinder rods in the respective hydraulic cylinders, and thus slows down and blocks movement of the boom relative to the crane structure or the mast of the crane in the top zone, wherein the control system is configured to switch the boom restrainer from the passive modus into the active modus when the one or more sensors register a loss of load and/or roll of the vessel, and wherein the hydraulic cylinders are compressed when the boom is pivoted upwards in the top zone, and the hydraulic cylinders tension the luffing wires.

* * * * *